United States Patent
Houlberg

(10) Patent No.: US 7,158,168 B2
(45) Date of Patent: Jan. 2, 2007

(54) AUTO FOCUS AND ZOOM CONTROLLER FOR CONTROLLING MULTIPLE CAMERAS

(75) Inventor: Christian L. Houlberg, Ventura, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 801 days.

(21) Appl. No.: 10/440,646

(22) Filed: May 13, 2003

(65) Prior Publication Data

US 2004/0227840 A1    Nov. 18, 2004

(51) Int. Cl.
*H04N 7/18*    (2006.01)
(52) U.S. Cl. ..................................... 348/169
(58) Field of Classification Search ................ 348/169, 348/170, 171, 172; 701/15; 73/178 T; 346/107.2
See application file for complete search history.

(56) References Cited

U.S. PATENT DOCUMENTS

| | | | | |
|---|---|---|---|---|
| 5,726,747 A | * | 3/1998 | Houlberg et al. | ........... 348/169 |
| 5,729,338 A | * | 3/1998 | Houlberg et al. | ........... 348/169 |
| 6,072,571 A | * | 6/2000 | Houlberg | ................ 348/169 |
| 6,172,747 B1 | * | 1/2001 | Houlberg | ................ 348/169 |
| 2002/0065588 A1 | * | 5/2002 | Johnson | ................. 701/15 |
| 2004/0004662 A1 | * | 1/2004 | Hsieh | ..................... 348/169 |
| 2004/0227819 A1 | * | 11/2004 | Houlberg | ............. 348/207.99 |

FOREIGN PATENT DOCUMENTS

JP        09210722 A   *   8/1997

\* cited by examiner

*Primary Examiner*—Vivek Srivastava
*Assistant Examiner*—Jason Whipkey
(74) *Attorney, Agent, or Firm*—David S. Kalmbaugh

(57) ABSTRACT

An Auto Focus and Zoom Controller for controlling multiple cameras and their lens tracking a vehicle in flight at a test range. The Auto Focus and Zoom Controller controls camera lens functions including focus, focal length, and exposure settings, based upon information stored in a track file, in order to obtain optimal recordings of launch events at the test range.

19 Claims, 25 Drawing Sheets

AUTO FOCUS AND ZOOM CONTROLLER FOR CONTROLLING MULTIPLE CAMERAS

BACKGROUND OF THE INVENTION

1. Field of the Invention

The present invention relates generally to a System for controlling multiple camera lenses. More particularly, the present invention relates to a camera lens control system for use at a test range which controls camera lens functions in order to obtain optimal recordings of launch events at the test range.

2. Description of the Prior Art

Presently, the military finds it very difficult, if not impossible, to monitor and document the flight of a missile, a rocket or other high speed vehicle during the testing of the high speed vehicle at a test range. To monitor and document a test flight, an operator is required to adjust the focus, field of view, and exposure for an image during range operations. To document a missile or rocket launch the focus, field of view, and exposure is set at the beginning of the launch to record the launch of high speed vehicle from the launch pad.

As the vehicle moves further away from the cameras the focus, field of view, and exposure settings of their lenses are adjusted to provide as accurate of a recording as possible given the constraints of an operator adjusting each of these camera lens functions.

In one configuration a camera is mounted on a range telescope which uses a focus table requiring the operator to adjust calibration settings to keep the high speed vehicle in focus. While the focus table is computer controlled, range input is not provided to the computer, which is information the computer needs to adjust camera focus.

In a second configuration, a camera is mounted to a lens system capable of manual and computer control. As computer control is not available, manual control of the lens system is necessary to keep the high speed vehicle in focus and with the desired focal length and exposure settings. This problem is compounded when attempting to adjust more than one camera lens system at a time.

SUMMARY OF THE INVENTION

The Auto Focus and Zoom Controller is a camera lens control system developed to aid in documenting range operations during testing of high speed vehicles, such as a missile in flight. The Auto Focus and Zoom Controller is designed to control camera lens functions (focus, focal length, and exposure settings), based upon information contained in a track file, in order to obtain optimum recordings of launch and flight events.

The Auto Focus and Zoom Controller is designed to interface to and control as many as three types of camera lens systems simultaneously. It is capable of controlling the focus of two Focus Tables, and the focus, zoom, and iris of two lens systems. The focus, zoom, and iris settings are based upon a predicted target flight path, and a desired field-of-view and exposure data contained in the track file. The track file is stored on a PC memory card.

Activation of the track file data as well as a manual control capability of lens settings is provided for via a USB (Universal Serial Bus) Game Pad. Remote activation of the track file data can also provided by a remotely located switch. A switch pad was also developed to control the lens functions. A video overlay of the focus, zoom, and iris settings as well as the controller's status is provided to document the settings of both lens systems. The video overlay is also capable of displaying the status of the Focus Table.

Operation of the Auto Focus and Zoom Controller begins upon application of power to the controller. Once the controller has completed its power-up initialization it will proceed to a standby mode waiting for an activate track signal or a manual control signal. During initialization the controller will attempt to access a lens configuration file (config.txt) and open the track file on the PC Memory Card. If the track file is found, the controller will set the lenses to their initial settings as indicated in the file. If the lens configuration or track file are not found or no PC Memory Card is inserted into the controller, the controller will set the lenses to focus at infinity with their widest field-of-view and greatest f-stop for camera protection and then wait for manual control.

The lens configuration file provides display, data file, and lens control and lens calibration information to the Auto Focus and Zoom Controller. The display information indicates what is to appear on the overlays and what the color of those overlays should be. The data file information contains the name of the track file and the lens control information indicating which lens systems are connected. The lens calibration information contains calibration data for visible or near infrared light generation.

The lens configuration file and track file data are set up using a Microsoft Excel file containing a programmed macro functions to assist in their generation. The resulting configuration file data is saved as a text file which is config.txt. The resulting track file data is saved as a tab delimited text file. The lens configuration file and the track file are the only two files on the PC Memory Card that are required by the Auto Focus and Zoom Controller.

The Auto Focus and Zoom Controller includes device driver software which is DOS compatible. The device driver software allows for communications between the USB game pad and the Auto Focus and Zoom Controller via the Universal Serial Bus. The implementation standard used for the Universal Serial Bus is the Universal Host Controller Interface (UHCI). The device driver software implements the Universal Host Controller Interface which defines how the USB controller talks to the host computer and its operating system which is Microsoft's DOS Version 3.1 or better.

DETAILED DESCRIPTION OF THE PREFERRED EMBODIMENT

Figure 1:
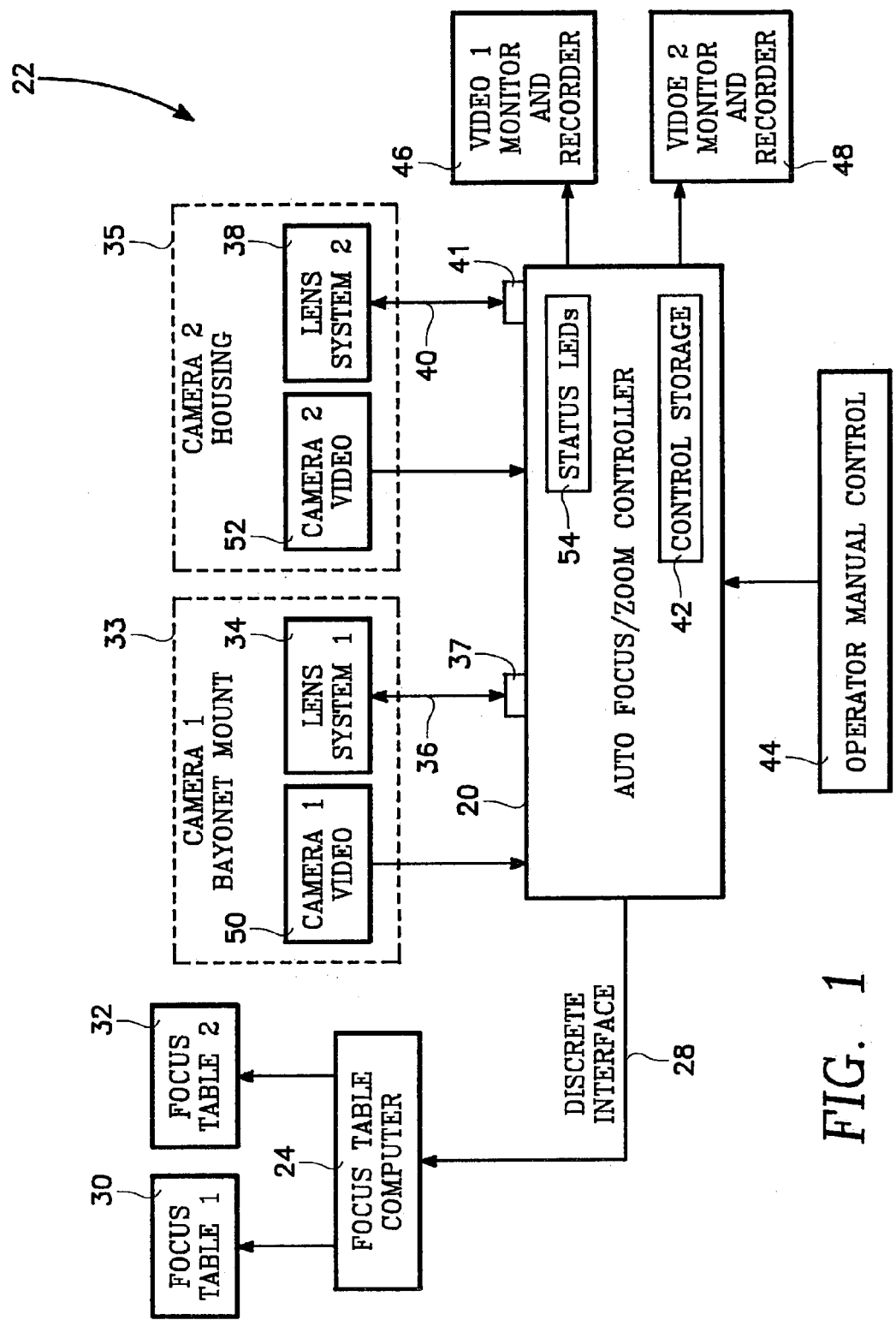
FIG. 1 is a block diagram which illustrates the Auto Focus and Zoom Controller interfaced to video and electronic devices of a range flight recording system.
Figure 2:
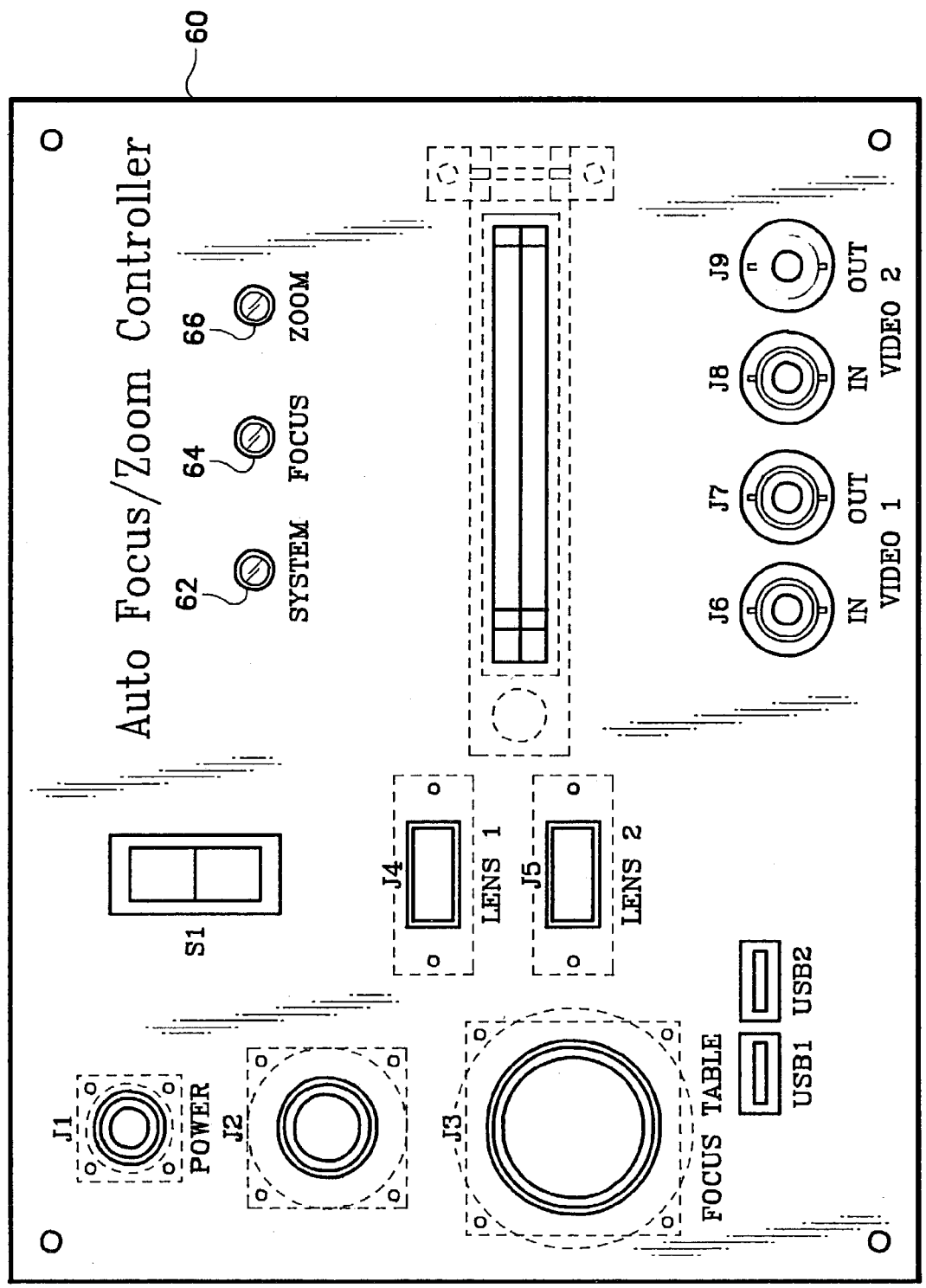
FIG. 2 illustrates the front panel for the Auto Focus and Zoom Controller of FIG. 1.

Referring first to FIGS. 1 and 2, the Auto Focus and Zoom Controller 20 comprising the present invention is interfaced to video and electronic devices of a range flight recording system 22. Three lens systems of the range flight recording system 22 are connected to Auto Focus and Zoom Controller 20. One of the three lens systems comprises a pair of focus tables 30 and 32 which are controlled by a focus table computer 24 connected to controller 20 via a discrete interface 28. Connected to focus table computer 24 is focus table 30 and focus table 32. Focus tables 30 and 32 are manufactured by Photo-Sonics Incorporated of Burbank, Calif.

Another of the three second lens system comprises an optical lens system 34 and a camera 50. The optical lens system 34 is mounted on bayonet mount 33 on camera 50. The optical lens system 34 is a Fujinon Inc. A36X14.5ERD lens controlled via an RS-232 interface 36 connecting optical lens system 34 to a communication port 37 for Auto Focus and Zoom Controller 20.

The last of the three lens system comprises an optical lens system 38 and a camera 52 which are mounted in a camera housing 35. The optical lens system 38 is a DOS-Z300-820/6400AP lens manufactured by Davro Optical Systems Inc., Lansdale, Pa., which is controlled via an RS-422 interface 40 connecting optical lens system 38 to a communication port 41 for Auto Focus and Zoom Controller 20.

Both communications ports 37 and 41 of Auto Focus and Zoom Controller 20 can accommodate an RS-232 interface, however, an external RS-232 to RS-422 converter is required to accommodate an RS-422 interface.

The data for automatic control of the lens systems 34 and 38 is contained in a control storage module 42 within Auto Focus and Zoom Controller 20. Control storage module 42 is a PCMCIA PC memory card which includes a configuration file and a track file. The configuration file contains information indicating which lens systems are connected to the Auto Focus and Zoom Controller 20, the lens system calibration information, the name of the track file and what information to display as an overlay on a video if video is used. The track file contains time, range, focal length, and exposure settings for each of the lens systems 34 and 38 connected to Auto Focus and Zoom Controller 20.

Auto Focus and Zoom Controller 20 also has a video overlay capability to document range events. Relative time from the start of an event, such as a missile launch, lens settings and control information can be displayed independently on the images obtained from lens system 34 and lens system 38.

Figure 3:
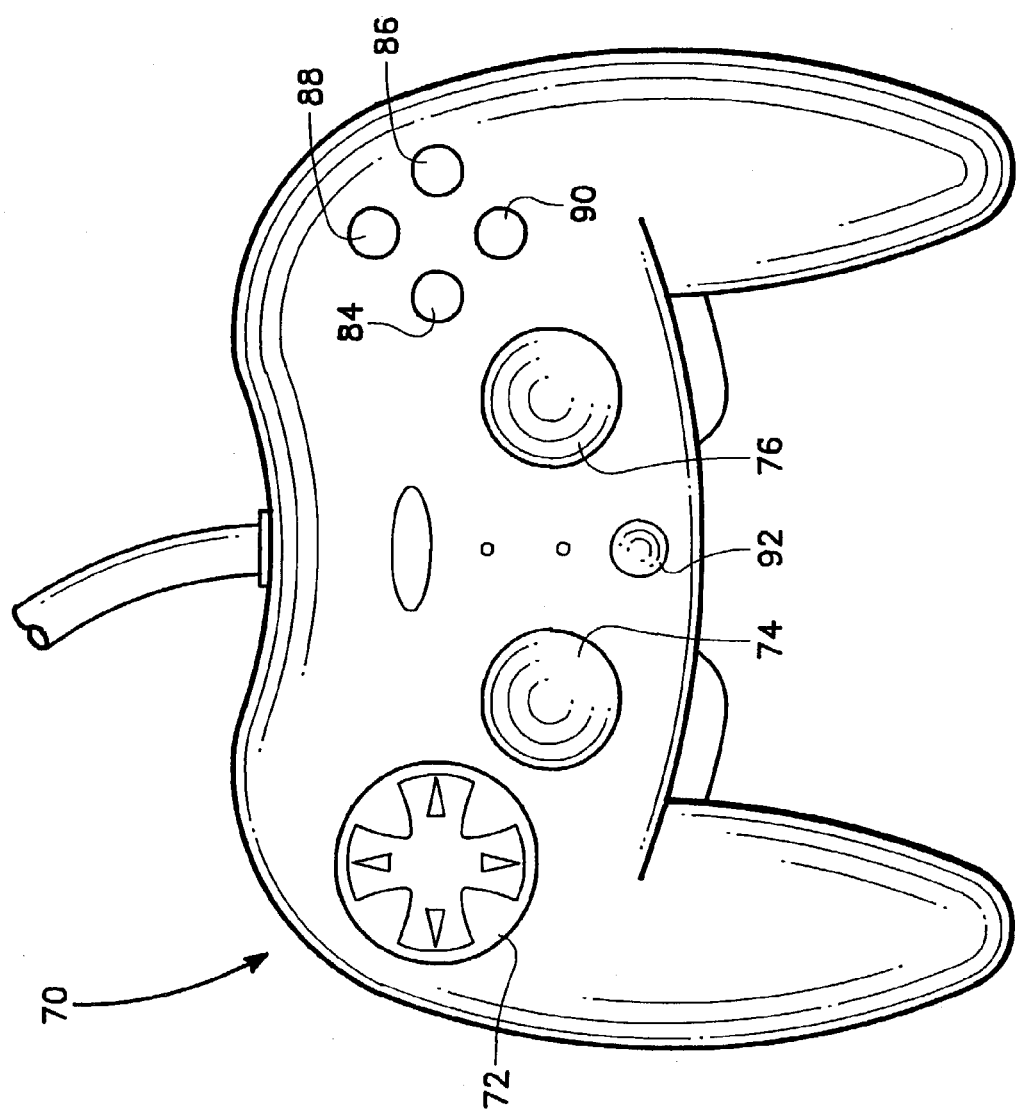
FIGS. 3 and 4 illustrate the USB game pad used for operator control of the Auto Focus and Zoom Controller of FIG. 1.
Figure 4:
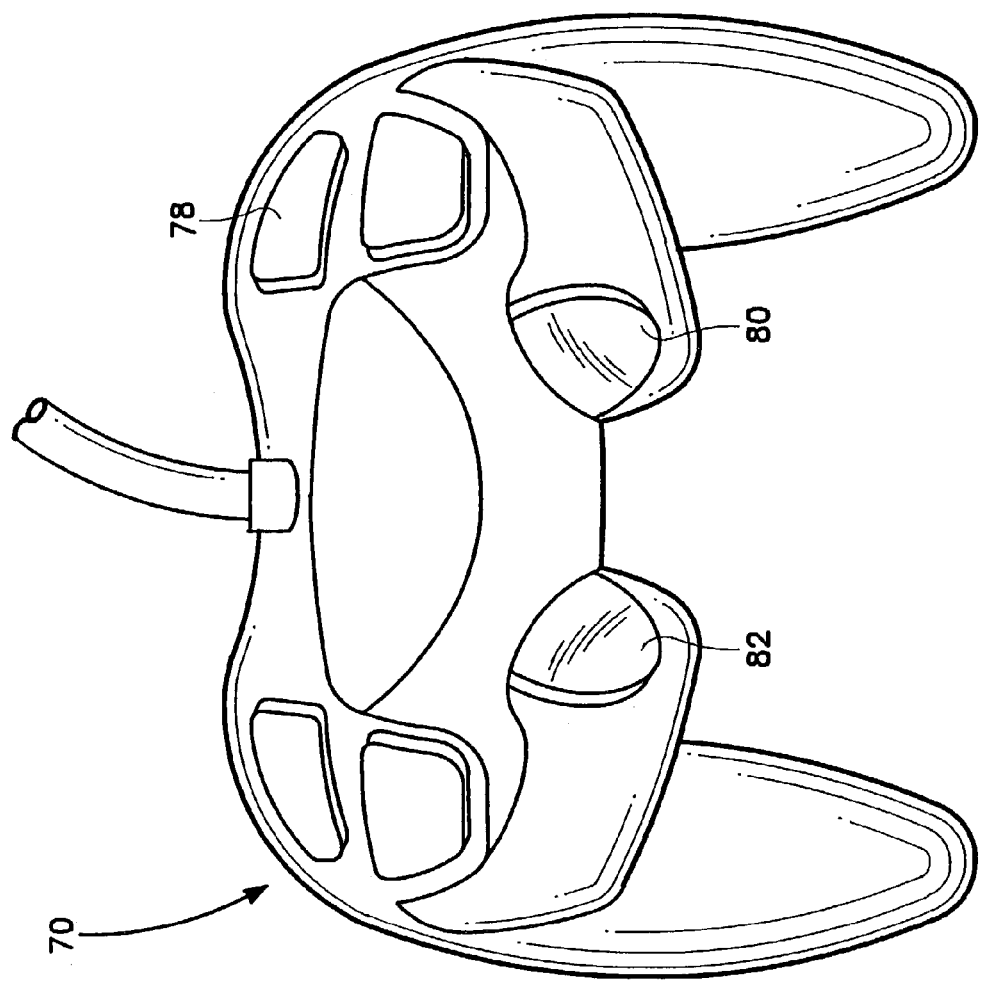
Figure 5:
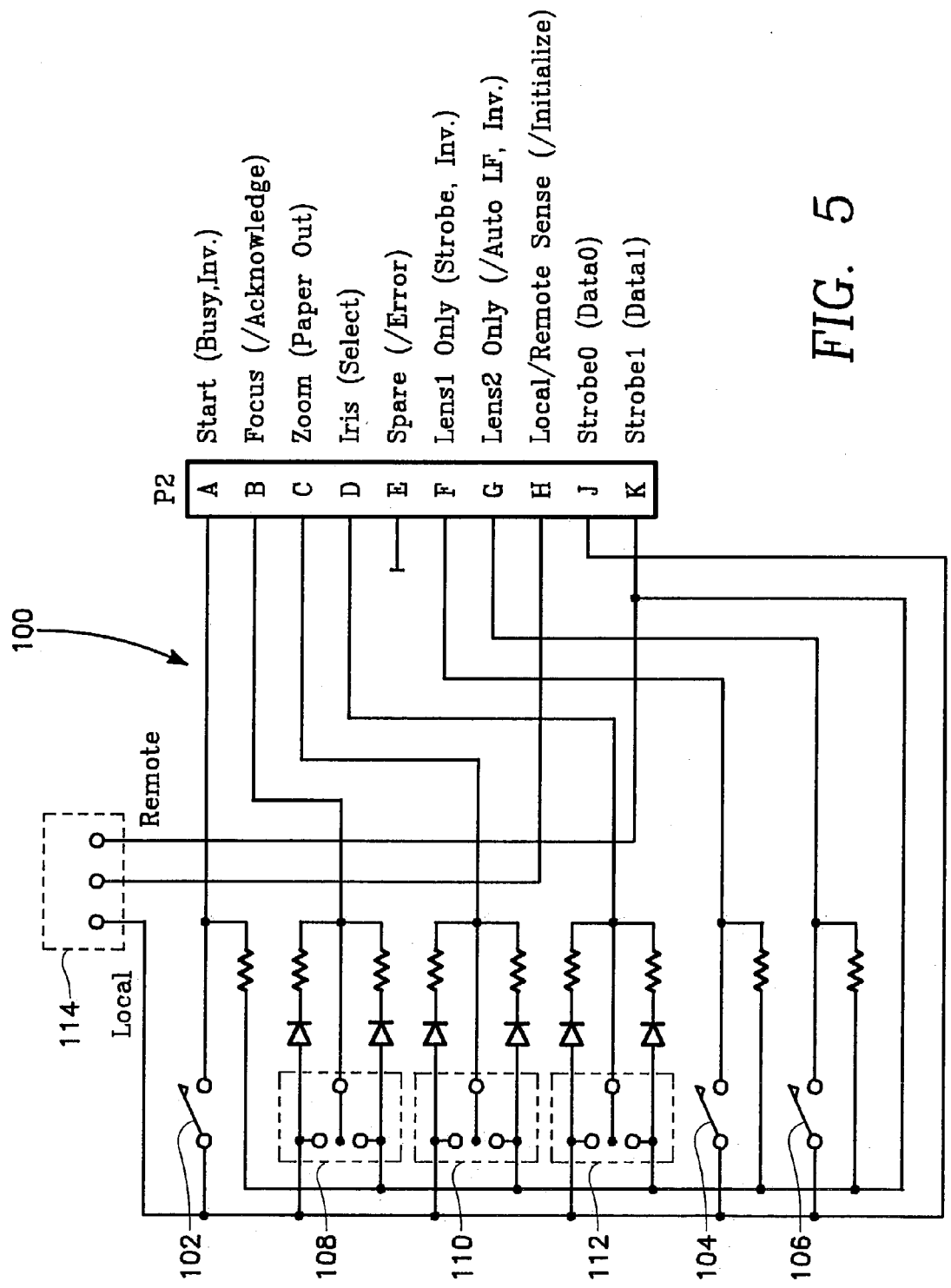
FIG. 5 illustrates the switch pad circuitry used for operator control of the Auto Focus and Zoom Controller of FIG. 1.

The Auto Focus and Zoom Controller 20 has an operator manual control 44 connected thereto which may be either a Game Pad 70 which is illustrated in FIGS. 3 and 4 or a switch pad 100 which is illustrated in FIG. 5. Game pad 70 provides a user with a manual control device which allows the user to start, pause and reset the track file control function as well as modify the track files settings and independently control any of lens systems' settings. Game pad 70 also allows a user to re-initialize the interfaces and reset the range flight recording system 22.

Activation of track file data as well as a manual control capability of track file settings is provided by commercially available Game Pad 70. Remote activation of the track file data can also provided by a remotely located switch. The circuitry for switch pad 100 was also developed to control lens functions; however, the Game Pad 70 is currently in use since its control capabilities exceed the control capabilities of switch pad 100.

A video overlay of the focus, zoom, and iris settings for the lens systems 34 and 38 as well as the controller's status is provided to document the settings of lens systems 34 and 38. This video overlay also includes the capability of displaying the status of the Focus Tables 30 and 32.

Operation of the Auto Focus and Zoom Controller 20 begins upon application of power to controller 20. Once the controller 20 has completed its power-up initialization controller 20 will enter a standby mode waiting for an activate track signal or a manual control signal. During initialization controller 20 will attempt to access the lens configuration file (config.txt) and open the indicated or predicted track file on PC Memory Card 42. If the track file is found, controller 20 will set the lenses to the initial settings as indicated in the file.

If the lens configuration or track files are not found or a PC Memory Card is not inserted into controller 20, controller 20 will set the lenses to focus at infinity with their widest field-of-view and greatest f-stop. This provides for camera protection with controller 20 waiting for manual control via Game Pad 70.

The lens configuration file (config.txt) provides display, data file, lens control, and lens calibration information to Auto Focus and Zoom Controller 20. The display information indicates what is to appear on the overlays and what the color of the overlays should be. The data file information contains the name of the track file and the lens control information indicates which lens systems are connected. The lens calibration information contains calibration data for visible or near infrared light operation. The lens configuration file and track file data are set up using a Microsoft Excel file containing programmed macro functions to assist in their generation. The resulting configuration file data is saved as a text file (config.txt). The resulting track file data is saved as a tab delimited text file. The lens configuration file and the track file are the only two files on the PC Memory card 42.

The lens configuration file (config.txt) and the track file are stored on PC Memory Card 42 (FIG. 1).

Referring to FIGS. 1, 2, 3, 4 and 5, the Auto Focus and Zoom Controller 20 operates on 120 VAC power. It is connected to at least one Lens System or Focus Table and activated with Game Pad 70, or a Switch Pad 100, or a Remote Switch.

The power cable connects from a standard three prong AC outlet to connector J1 located on the front panel 60 for controller 20. The lens systems 34 and 38 connect to either connector J4 or connector J5 located on front panel 60. The Focus Table connection, made via connector J3, connects the Auto Focus and Zoom Controller 20 to the range data input for Focus Table Computer 24. The Focus Table Computer 24, in turn, controls up to two Focus Tables 30 and 32. The Universal Serial Bus (USB) Game Pad 70 is connected to the USB1 or the USB2 connector on front panel 60 or a Remote Switch or Switch Pad 100 connected to J2 can be used to activate the track file. The USB Game Pad 70 and Switch Pad 100 also provide an operator with direct manual control capability of the Lens Systems and Focus Table.

The front panel 60 for controller 20 also includes optional connections. The optional overlay of system and lens status is provided by Video 1 and Video 2 overlays. The status for the Lens System connected to J4 is provided by the Video 1 overlay. To obtain this overlay connect the camera 50 video output to J6 (Video 1 In) and display the result from J7 (Video 1 Out) on monitor 46. Similar connections are made to display the status of the Lens System 38 connected to J5. Camera 52 video output is connected to J8 (Video 2 In) and the result from J9 (Video 2 Out) is displayed on a monitor. The video overlays which appear on monitors 46 and 48 can also be recorded to document the Lens System and Focus Table settings during operation.

The game pad 70 is a commercially available USB Game Pad which allows an operator full control of all Lens System and Focus Table functions as well as control of all operational and display functions. The device driver interface for the game pad 70 was developed for the Thrustmaster Firestorm Dual Power USB Game Pad (FIG. 3 and FIG. 4), which was chosen for dual analog joysticks and a directional pad as well as the number of buttons available for different functions. The game pad is manufactured by Thrustmaster, a division of the Guillemot Corporation of France.

The USB Game Pad can be connected to either one of the USB ports USB1 or USB2 on the front panel 60 of controller 20. An extension cable can be used to extend the reach of the game pad an additional 15 feet.

The front panel 60 has a system LED 62, a Focus LED 64 and a Zoom LED 66. LEDs 62, 64 and 66 are three two-color light emitting diodes (LED) that comprise the system status display LEDs 54 for Auto Focus and Zoom Controller 20. The SYSTEM LED 62 operates in the following manner:

Solid Green indicates that the Auto Focus and Zoom Controller 20 is functioning normally. The configuration file (config.txt) and the track file have been detected and successfully read, a USB Game Pad or Switch Pad or Remote Switch, was detected and all Lens Systems and the Focus Tables are initialized and functioning as specified.

Blinking Green indicates manual operation capability only. A USB Game Pad or Switch Pad was detected; however, no PC Memory Card was detected or no configuration file or track file was read from the PC Memory Card.

Blinking Red indicates the system is partially functioning. A USB Game Pad or Switch Pad or Remote Switch was detected, however, at least one Lens System or Focus Table interface indicated in the configuration file did not initialize and at least one Lens System or Focus Table interface is properly functioning.

Solid Red indicates the system is not operational. Either a USB Game Pad or Switch Pad or Remote Switch were not detected or no Lens Systems or Focus Table interface is functioning.

The FOCUS LED 64 operates in the following manner. Green indicates the focus distance of a Lens System or the Focus Table is increasing. Red indicates the focus distance of a Lens System or the Focus Table is decreasing. When there is no color indicates, there is no change in the setting of any Lens System or Focus Table.

The ZOOM LED 66 operates in the following manner. Green indicates the focal length of a Lens System is increasing. Red indicates the focal length of a Lens System is decreasing. When there is no color indicates there is no change in the setting of any Lens System.

The only Focus Table function is Focus control. The Lens System functions are Focus, Zoom (focal length), and Iris control. These functions are controlled using the focus and zoom joysticks 74 and 76, respectively and the iris directional pad 72 shown in FIG. 3 and enabled using the Focus Table Select button/switch 78, the Lens Select button/switch 80 and the Lens2 Select button/switch 82 shown in FIG. 4. To increase the focus distance or focal length (zoom into the object) of the lens or increase the attenuation of light (f-stop) through the lens the joysticks 74 and 76 or directional pad 72 are pushed away or forward from the operator.

All three functions may be activated at the same time for any combination of Lens System and Focus Table. It should be noted that the Focus Table has no focal length or iris adjustment.

The following are illustrative of the operation of the Auto Focus and Zoom Controller:

(1) The operator increases the focus distance of the Focus Table by pressing the Focus Table Select switch 78 with the index finger of the left hand and pushing the Focus joystick 74 forward with the thumb of the left hand.

(2) The operator decreases the focal length (zoom away from the object) of Lens System 34 by pressing the Lens1 Select switch 80 with the middle finger of the left hand and pulling the Zoom joystick 76 back with the thumb of the right hand.

(3) The operator increases the f-stop and reduces the amount of light passing through Lens System 38 by pressing the Lens2 Select switch 82 with the middle finger of the right hand and press the directional pad 72 forward with the thumb of the left hand.

The operational functions provided by game pad 70 include Start Track, Stop Track, Reset Track, and Clear Offsets. Pressing the Start Track, Stop Track, Reset Track, and Clear Offsets buttons 84, 86, 88 and 90, respectively, controls these functions.

The Start Track button 84 is pressed to start the automatic control of the Lens Systems 34 and 38 and Focus Tables 30 and 32 based upon the records contained in the track file. When the Stop Track button 86 is pressed the track file control will pause keeping the lens control functions and the displayed time set to the values contained in the last record read from the track file. Pressing the Start Track button 84 continues automatic control.

Pressing the Reset Track button 88 can restart automatic control of the Lens Systems 34 and 38 and Focus Tables 30 and 32. If automatic control had been paused, pressing the Reset Track button 88 will reset the pointers in the track file to the first record in the file and maintain the pause until activated with the Start Track button 84. If the automatic control had been running, pressing the Reset Track button 88 will reset the pointers in the file to the first record in the file and then continue automatic control.

The operator may at any time enter offsets to the values set by the track file by activating the Focus, Zoom, and Iris controls, i.e. joysticks and directional pad 72, 74 and 76 on game pad 70. Pressing the Clear Offsets button 90 clears these offsets. The Lens Systems and Focus Table settings will then revert back to the values indicated in the track file.

The only display function is a Toggle Overlay function and is activated by pressing the Toggle Overlay button 92 shown in FIG. 3. The video overlays will initially be displayed as indicted in the lens configuration file. These overlays will default to white if no lens configuration file or PC Memory Card 42 is found.

Pressing the Toggle Overlay button 92 will sequence the video overlays from white to black to none (no overlay) and back to white again. This function gives the operator the capability to set the overlay for the best viewing against the background in real time.

There are two miscellaneous functions available with Auto Focus and Zoom Controller 20. These are "Re-initialize" and "Reset" functions which are not used during normal operations. To prevent their accidental activation of the "Re-initialize" and "Reset" functions the operator is required to press more than one button simultaneously.

To re-initialize all the interfaces the operator presses and releases the Toggle Overlay button 92 while pressing the Clear Offsets button 90. Upon releasing the Clear Offsets button 90 and the Toggle Overlay button 92, the Auto Focus and Zoom Controller and all connected Lens Systems will be re-initialized.

To reset the entire system the operator presses and releases the Toggle Overlay button 92 while the Clear Offsets button 90 and the Reset Track button 88 are pressed. It will take approximately 30 seconds for the system to resume lens control.

The Auto Focus and Zoom Controller 20 operates in a Microsoft Disk Operating System (MS-DOS) environment using MS-DOS version 6.22. The operation of the system requires two sets of device drivers that provide the control pad and PCMCIA interfaces. The device drivers are installed during the power-up process by the system configuration file (config.sys). The "autoexec.bat" file invokes the Auto Focus and Zoom Controller program (lensctlr.exe).

The systems configuration (config.sys) is an operating system setup file which establishes device drivers and memory usage. The autoexec.bat file establishes pointers and the program to be executed. The Controller 20 includes a C drive for storage of the autoexec.bat and config.sys files The listing for the systems configuration file is set forth as follows:

```
DEVICE=C:\DOS\HIMEM.SYS
DOS=HIGH,UMB
BUFFERS=15,0
FILES=30
REM ***** Control Pad Device Driver *****
DEVICE=C:\CTRL_PAD.SYS
REM ***** End of Control Pad Device Driver *****
REM ***** PCMCIA Device Drivers *****
DEVICE=C:\CARDWARE\DPMS.EXE MEM=XMS
DEVICEHIGH=C:\CARDWARE\PCC.EXE /SC:off
DEVICE=C:\CARDWARE\PCRM.EXE /AUTODETECT
DEVICEHIGH=C:\CARDWARE\SSPCIC.EXE /EC:auto /II:off
DEVICEHIGH=C:\CARDWARE\PCENABLE.EXE
DEVICEHIGH=C:\CARDWARE\PCATA.EXE
DEVICEHIGH=C:\CARDWARE\PCSRAM.EXE
DEVICEHIGH=C:\CARDWARE\PCFLASH.EXE
DEVICEHIGH=C:\CARDWARE\PCDISK.EXE
REM ***** End of PCMCIA Device Drivers *****
```

The listing for the autoexec.bat file is set forth as follows:

```
@ECHO OFF
PROMPT $p$g
PATH C:\DOS;C:\BATCH
SET TEMP=C:\TEMP
REM Inserted for Auto Focus/Zoom Controller *** Start
PATH C:\LensCtlr,%PATH%
REM Inserted for Auto Focus/Zoom Controller *** End
REM Inserted by CARDWARE Setup *** Start
PATH C:\CARDWARE,%PATH%
REM Inserted by CARDWARE Setup *** End
REM Choice to continue or abort to DOS
CHOICE /c:ca /t:c,1 "Continue or Abort"
If errorlevel 2 goto EXIT
LensCtlr
:EXIT
```

The lens configuration file contains configuration categories and parameters that describe the interfaces that are supported by the Auto Focus and Zoom Controller 20. The lens configuration file is setup during the process of establishing the track file. This is done with programmed macro functions embedded in a Microsoft Excel file.

There is a displays category in the lens configuration file which provides the initial overlay color for the displays. The displays for range flight recording system 22 are a video 1 monitor and recorder 46 and a video 2 monitor and recorder 48 which are connected to Auto Focus and Zoom Controller 20. The initial overlay color can be set to white, black or none (no overlay) to support various background and documentation requirements. A console display is set to ON, for debugging, or OFF, for normal operation. A Focus Table overlay is set to ON, to show on all overlays, or OFF, to display only Lens System status.

There is a data files category in the lens configuration file. The track file is the only data file that is currently being supported in the lens configuration file. This entry identifies the file name of the track file that the Auto Focus and Zoom Controller 20 uses during normal operation and can be set to NO for manual operation only. The track file name is restricted to eight ASCII characters or less to make it DOS compatible and uses a "txt" extension. If no entry is found the default track.txt is used.

There is a lens control category in the lens configuration file. This category contains a list of the available lens interfaces and their configuration. A Focus Table parameter is set to YES to enable Focus Table control and set to NO to disable that control (no Focus Table attached). The Lens #1 Type and/or Lens #2 Type can be set to NO to disable control through that interface or to FUJINON or DAVRO to establish a connection with lens systems 34 and 38.

There is a lens calibration category in the lens configuration file. This category contains calibration data for Lens #1 and Lens #2 to account for differences between lenses and to support differences in focus for near infrared as well as visible light operation.

A sample lens configuration file is set forth as follows:

```
[DISPLAYS]
COLOR=WHITE
CONSOLE=NO
FOCUS_TABLE_OVERLAY=NO
[DATA_FILES]
TRACK_FILE=track.txt
[LENS_CONTROL]
FOCUS_TABLE=NO
```

-continued

```
LENS1_TYPE=FUJINON
LENS2_TYPE=DAVRO
[LENS_CSLIBRATION]
LENS1_CAL=0XFFFF-0X0679,0XFFEF-0X0018,0XC963-0X2BCD
LENS2_CAL=VISIBLE
```

The track file contains a list of tab-delimited records describing the path the high speed vehicle or object will travel during flight as well as Lens System settings needed to document the high speed vehicle during the operation. This file also contains a heading with a label for each element in the record. The elements contained in each record are time in seconds, range in feet, azimuth and elevation in degrees, focal length setting for Lens system 34 in inches, iris setting for Lens system 34 as an f-stop, focal length setting for Lens system 38 in inches, and iris setting for Lens system 38 as an f-stop.

The track file data is generated using a Microsoft Excel file set up for this purpose. This Excel file is defined as CameraTrackFile.xls, it contains macros that are used to facilitate the generation of the camera lens data as well as the generation of the lens configuration file data, and must be enabled when opening the file. The following steps are required to generate track file data. A laptop or other personal computer may be used to generate track file data.

(1). The user copies the object's or vehicle's track profile data provided by range operations to columns A through D of a Range_Data sheet. The user can not modify the Range_Data sheet by adding or deleting any rows between and including rows 1 and 2 of this sheet. If the user modifies the Range_Data sheet the equations on the Tracking_Data sheet will be altered.

(2). The user enters the data describing the camera setup for lens system 34 and lens system 38 tables on a Camera_Data sheet. The user is provided plots of lens focal length vs. distance and image size vs. distance to aid in the selection. Table I sets forth lens system 34 table data.

TABLE I

| Lens #1 | |
|---|---|
| Parameters | Selection |
| Lens | Fujinon S/N-021033 |
| Sensor | ½" CCD |
| Object Length (ft.) | 80 |
| Image Size (% FOV) | 80 |
| Initial Exposure (f#) | 16 |
| Near IR (Yes/No) | No |

(a). The user selects Lens and Sensor parameters selected by entering a reference to a cell in the appropriate table containing the data. The Lens and Sensor selections are made from the Lens Focal Length data of Table II and the Sensor Format of Table III respectively.

TABLE II

| Lens Focal Length (inches) and Exposure Range (f#) | | | | |
|---|---|---|---|---|
| Lens | Min. FL | Max. FL | Min f# | Max f# |
| Fujinon S/N-020957 | 0.57 | 20.47 | 2.7 | 20.0 |
| Fujinon S/N-02/033 | 0.57 | 20.47 | 2.7 | 20.0 |
| Fujinon S/N-03/066 | 0.57 | 20.47 | 2.7 | 20.0 |
| Fujinon S/N-02/068 | 0.57 | 20.47 | 2.7 | 20.0 |

TABLE II-continued

| Lens Focal Length (inches) and Exposure Range (f#) | | | | |
|---|---|---|---|---|
| Lens | Min. FL | Max. FL | Min f# | Max f# |
| Davro S/N-454 | 32.28 | 251.97 | 3.5 | 20.98 |
| Davro S/N-455 | 32.28 | 251.97 | 3.5 | 20.98 |
| Davro S/N-456 | 32.28 | 251.97 | 3.5 | 20.98 |
| Fujinon S/N-457 | 32.38 | 251.97 | 3.5 | 20.98 |

TABLE III

| Sensor Format | | |
|---|---|---|
| Sensor | H (inches) | V (inches) |
| 16 mm | 0.410 | 0.296 |
| 35 mm | 0.995 | 0.745 |
| ⅓" CCD | 0.167 | 0.125 |
| ½" CCD | 0.251 | 0.189 |
| ⅔" CCD | 0.333 | 0.250 |
| 1" CCD | 0.502 | 0.378 |
| V5 | 0.650 | 0.650 |
| V7 | 0.520 | 0.693 |

(b). The user enters object length in feet and the desired image size as a percentage of the field-of-view.

(c). The user enter the Initial Exposure as an equivalent f-stop number referring to the lens exposure range for acceptable f-stop values. If a value outside the range is entered by the user Auto Focus and Zoom Controller 20 will use the nearest value within the range.

(3). The user points and clicks on a Generate File button on the laptop computer screen to generate and save the new tracking and lens configuration data. The tracking data is generated on the Tracking_Data sheet and the lens configuration data is generated on the Config_Data sheet. A "Save As" box is opened to save the tracking data as a text (tab delimited) file. The configuration data is automatically saved as a text file (config.txt. The program is exited after the files are saved. The track file name must be restricted to eight ASCII characters or less (DOS compatible) and the user is required to use a "txt" extension. This facilitates examining the file with a text editor, such as Microsoft's Notepad, to verify the validity of the data.

Lens system 34 which is the A36X14.5ERD Fujinon lens utilizes has a standard RS-232C interface 36. Lens system 34 communicates using 8-bit bytes with no parity check and one stop bit at 38.4 Kbps. The data sent to and received from the lens is binary, non-ASCII, data constructed in blocks not exceeding 18 bytes in length. The general form of the communications is a command sent to the lens system 34 followed by a response from the lens system 34. The command interval is less than 5 seconds to avoid a lens disconnect. The Auto Focus and Zoom Controller 20 currently uses individual commands to control the focus, focal length, and iris settings of the lens. The data contained in the commands, which set the various lens functions, is 2-bytes in length and does not represent a numerical value for the lens functions. The data represents a position on a servo that sets the lens function. The following table illustrates sample commands and responses for the functions of lens system 34.

TABLE I

SAMPLE COMMANDS AND RESPONSES

| Function | Command/Request | Response |
| --- | --- | --- |
| General Command Form | LFDDDDDDDDDDDDDDCC<br>L = Data Length Byte<br>F = Function Byte<br>D = Data Byte<br>C = Checksum Byte | LFC<br>L=0<br>F=Function Byte<br>C=Checksum Byte |
| General Request Form | LFC<br>L = 0<br>F = Function Byte<br>C = Checksum Byte | LFDDDDDDDDDDDDDDDC<br>L = Data Length Byte<br>F = Function Byte<br>D = Data Byte<br>C = Checksum Byte |
| Connect | 0x00 0x01 0xFF | 0x00 0x01 0xFF |
| Set Focus | 0x02 0x22 0xFE 0xBF 0x1F | 0x00 0x22 0xDE |
| Request Focus | 0x00 0x32 0xCE | 0x02 0x32 0xFE 0xBC 0x12 |
| Set Focal Length | 0x02 0x21 0xFD 0xE6 0xFA | 0x00 0x21 0xDF |
| Request Focal Length | 0x00 0x31 0xCF | 0x02 0x31 0xFD 0x9B 0x35 |
| Set Iris | 0x02 0x20 0x3E 0x27 0x79 | 0x00 0x20 0xE0 |
| Request Iris | 0x00 0x30 0xD0 | 0x02 0x30 0x54 0xBE 0xBC |

Mathematical functions were developed to translate the received data from the A36X14.5ERD Fujinon lens, i.e. lens system 34 to the focus, focal length, and iris settings on the lens housing of lens system 34. These equations along with their inverse are used to display and control the A36X14.5ERD Fujinon lens settings in a readable form.

The focus function is hyperbolic and is represented by the following equation:

$$w(x) = A + B/(C-x) \quad (1)$$

Where:

$$A = w0 - B/(C - x0)$$

$$B = 2 \ast x8$$

$$C = x8 - 347$$

$$x0 = 1687$$

$$w0 = 2.2$$

$$x8 = 65535$$

Due to the hyperbolic nature of the focus function, the received data from the lens system 34 for focal lengths larger than 20 feet is sensitive to least significant bit noise from the servo electronics. As a result the Auto Focus and zoom Controller 20 is programmed to display the value sent to the lens system 34, not the value received from the lens. It is therefore possible that the displayed value will not represent the actual value the lens system 34 is set to, especially if the focus control servo for lens system 34 is disengaged.

The focal length function is exponential and is represented by the following equation:

$$z(x) = D + E \ast \exp(F \ast x) \quad (2)$$

Where:

$$D = z(0) - E \ast \exp(F \ast x0)$$

$$E = z6/\exp(F \ast x6)$$

$$F = 5.18/x6$$

$$x0 = 24$$

$$z0 = 14.5$$

$$x6 = 65519$$

$$z6 = 520$$

This focal length function is much less sensitive to least significant bit noise coming from the servo electronics than the focus function. As a result the Auto Focus and Zoom Controller 34 is programmed to display the value received from the lens system 34. Even if the servo is disengaged the display will always show the actual focal length of lens system 34.

The iris or f-stop function is based on the relationship $f = (\sqrt{2})N$ where "N" is a measure of the attenuation of the light passing through the lens. The iris or f-stop function for this lens is as follows:

$$f(x) = (\sqrt{2})^N$$

Where:

$$N = 3 + 5 \ast (x5 - x)/(x5 - x0)$$

$$x0 = 11181$$

$$x5 = 51891$$

This iris or f-stop function is not sensitive to least significant bit noise coming from the servo electronics for lens system 34. Accordingly, the Auto Focus and Zoom Controller 20 is programmed to display the f-stop setting value received from the lens system 34. Even if the servo for lens system 34 is disengaged the display will always show the actual f-stop setting for lens system 34.

The interfaces 36 and 40 are modified with the Data Terminal Ready pin connected to +12 VDC through a 330 ohms resistor. This modification provides enough current driving capability to power an RS-232 to RS-422 converter and to interface to a terminated data line as required for the Davro lens. The RS-232 to RS-422 converter used in the interface 40 is also modified with it's receive lines terminated in 130 ohms to accomodate the Davro lens.

The DOS-Z00-820/6400-AP Davro lens, which is lens system 38, uses a four wire RS-422 interface terminated in 130 ohms. The communications between lens system 38 and Auto Focus and Zoom Controller 20 via RS-422 interface 40 is implemented using 8-bit ASCII characters with no parity check and one stop bit at 19.2 Kbps. The general form of the communications is a command sent to the lens system 40 followed by a response. The typical response time is 50 milliseconds and may be as long as 100 milliseconds to 400 milliseconds depending on the command sent by the Auto Focus and Zoom Controller 20.

The RS-232 to RS-422 converter used in this interface is modified with it's receive lines terminated in 130 ohms to meet the Davro lens requirement.

The data contained in the commands resides in an 8-byte data field. The specific format of the data varies according to the required command mnemonics. All numeric data is left justified within the data field and may be padded with leading zeros or trailing spaces. The values represented in the data field correspond to the actual values of that specific function.

Sample commands and responses for lens system 38. i.e. Davro lens, are set forth in the following table:

TABLE II

SAMPLE COMMANDS AND RESPONSES

| Function | Command/Request | Response |
|---|---|---|
| General Command Form | !ccddddddddss<or> ! = Lead in character cc = Command mnemonic d = Data character ss = ASCII checksum <cr>=Carriage return character | @SSpzfwxyimss<cr> @ = Response lead in character SS = Status packet identifier p = Previous packet status z = Zoom module status f = Focus module status w = Not used (set to 'X') x = Zoom module limit status y = Focus module limit status i = Iris control source m = Memory status ss = ASCII checksum <cr> = Carriage return character |
| Set Focus | !FD0000113333<cr> | @SSARBXWFMP4D<cr> |
| Request Focus | !TDD DD<cr> | @FD 349320.4D<cr> |
| Set Focal Length | !FL000002523C<cr> | @SSARRXRRMP64<cr> |
| Request Focal Length | !TDL E5<cr> | @FL o251.5 3D<cr> |
| Open Iris | !IRMO 18<cr> | @SSARRXRRMP4B<cr> |
| Close Iris | !IRMC 0C<cr> | @SSARRXRRMP64<cr> |
| Halt Iris | !IRMH 11<cr> | @SSARRXRRMP4B<cr> |
| Request Iris Value | !ER2 CA<cr> | @XD20014 . . . 5D<cr> |

The DOS-Z00-820/6400-AP lens requires no calibration of the focus and focal length functions. The focus and focal length functions are calibrated at the factory and adjust to the values specified in the commands. The iris function requires calibration.

The iris function is implemented with a neutral density filter that is commanded to allow more or less light through the lens, that is the iris is opened or closed. In effect, this is commanding the lens to go to a lower or higher f-stop. The position of the filter is measured with a potentiometer and converted to a digital value by an analog to digital (A/D) converter. The neutral density filter attenuates the amount of light passing through the lens throughout the equivalent f-stop range specified for the lens.

The system directory structure and its contents for controller 20 include the following directories.

There is a Root Directory (C:\) which includes the following visible (not hidden) contents:

| | |
|---|---|
| DOS | <DIR> |
| CARDWARE | <DIR> |
| LENSCTLR | <DIR> |
| ROOT | <DIR> |
| BACKUP | <DIR> |
| BATCH | <DIR> |
| TEMP | <DIR> |
| COMMAND.COM | MS-DOS command interpreter |
| CONFIG.SYS | System configuration file |
| AUTOEXEC.BAT | System auto-execution file |
| CTRL_PAD.SYS | Device driver for the control pad (USB Game Pad and Switch Pad) |
| WARMBOOT.COM | Program to re-boot system (USB Game Pad function) |

There is an MS-DOS directory which contains 18 files of which only 2 are used during normal operation:

HIMEM.SYS—Device driver that enables access to high memory (invoked in config.sys)

CHOICE.COM—Program that provides an execution choice (invoked in autoexec.bat)

There is a CardWare directory which contains 31 files, which consist of device drivers, programs, and tables that are used to access all types of PCMCIA PC Cards, that is memory card 42.

There is a program directory which contains one file. This is the Auto Focus/Zoom Controller program (lensctlr.exe).

There is a root backup directory which contains a copy of all the visible (not hidden) files. These file are needed in the event a file in the root directory is inadvertently deleted or corrupted. Copying the faulty file back into the root directory can be used to restore the file. There is a program backup directory which contains a copy of the Auto Focus/Zoom Controller operating program for controller 20. The operating program can be restored from this directory if it is inadvertently deleted.

There is a temporary batch program directory which is not used at this time. All batch programs are to be located in this directory.

There is a temporary file directory which is not used at this time. All temporary files are to be located in this directory.

Referring to FIGS. 1 and 5, switch pad 100 was developed as an alternative to the USB Game Pad 70 illustrated in FIGS. 3 and 4. The switch pad contains controls for a subset of functions available with the USB Game Pad. These are Lens System and Focus Table functions as well as operational functions. The Switch Pad 100 is connected to J2 on the front panel 60. Game Pad 70 is plugged into USB1 or USB2 on the front panel of the Auto Focus and Zoom Controller 20.

The "CTRL_PAD.SYS" device driver within the systems configuration file provides the Switch Pad interface as well as the USB Game Pad interface. This is a discrete interface that makes use of a parallel port LPT1 which is partially wired to connector P2. The parallel port is configured in the BIOS to operate in SPP mode so the status and control lines can be used as inputs and the data lines used as outputs.

The switch positions are sensed using the Data0 and Data1 lines as strobes and testing for changes in the status and control inputs that correspond to a particular switch (FIG. 5). The strobes are normally high and provide a voltage to the input lines through a diode and 5 K-ohm resistor when the switches are open. When a switch closes the strobe voltage appears directly on the input lines. Pulsing a strobe low will pull any input lines low that are connected to the strobe through a closed switch.

As depicted in FIG. 5, switch pad 100 has a start track switch 102, a lens1 switch 104 and a lens2 switch 106 which are push button switches. Switch pad 100 also has a focus switch 108, a zoom switch 110 and an iris switch 112 which are toggle switches. The Focus, Zoom (focal length), and Iris functions are controlled with the toggle switches 108, 110 and 112, respectively, as indicated in FIG. 5. Activating any combination of these switches will simultaneously control the Focus, Zoom, and Iris functions. To independently control the Lens System 34, the Lens1 push button switch 104 must be pressed while the toggle switch is activated. To control Lens System 34 and Lens System 38 (not the Focus Table) both Lens1 and Lens2 push button switches 108 and 10 must be pressed while the toggle switch is activated. In a manner similar to the USB Game Pad 70 to increase the focus distance or focal length (zoom into the object) of the lens or increase the attenuation of light (f-stop) through the lens the toggle switches are pushed away (forward) from the operator.

The operational functions are Start Track, Stop Track, and Clear Offsets. Stop Track and Clear Offsets are multi-button functions. As with the USB Game Pad 70, the Start Track button 102 is pressed by the operator to start the automatic control of the Lens Systems and Focus Table based upon the records contained in the track file.

To implement the Stop Track function the operator presses and releases the Start Track button 102 while the Lens2 Select button 106 is pressed by the operator. The lens control functions and displayed time will remain set to the values last read from the track file.

Any manual control inputs to the lens control functions can be cleared by pressing and releasing the Start Track button 102 while the Lens1 Select button 104 is pressed. This will return these settings to the ones last read from the track file or to the default settings if a track file is not found.

There is also a remote switch (not illustrated) which can be used to activate the Start Track function. This function provides automatic control of the Lens Systems and Focus Table based upon the records contained in the track file. The switch must be wired to connector P2.

The "CTRL_PAD.SYS" device driver provides the initialization, input, and output functions needed to operate the USB Game Pad 70. The hardware portion of the interface is implemented on a CoreModule/P5e computer board with a compatible Universal Host Controller Interface (UHCI). Due to the operational nature of the UHCI interface and the CardWare device drivers needed for a PCMCIA interface, a device driver is required for the USB interface.

When the CardWare device drivers are loaded the operating system configuration is changed from Real Mode to Virtual-Real Mode. As a result, real physical memory address locations required by the UHCI cannot be determined within the operating software. The UHCI initialization software must execute before the CardWare device drivers are loaded and hence must also be a device driver.

Initialization of the USB interface for USB game pad 70 is accomplished in three steps. The first step allocates and locates memory for control transfers and data transfers on the USB bus. The second step initializes the Universal Host Controller Interface. The third step detects the USB Game Pad and performs the enumeration process for the USB game pad 70.

Figure 6:
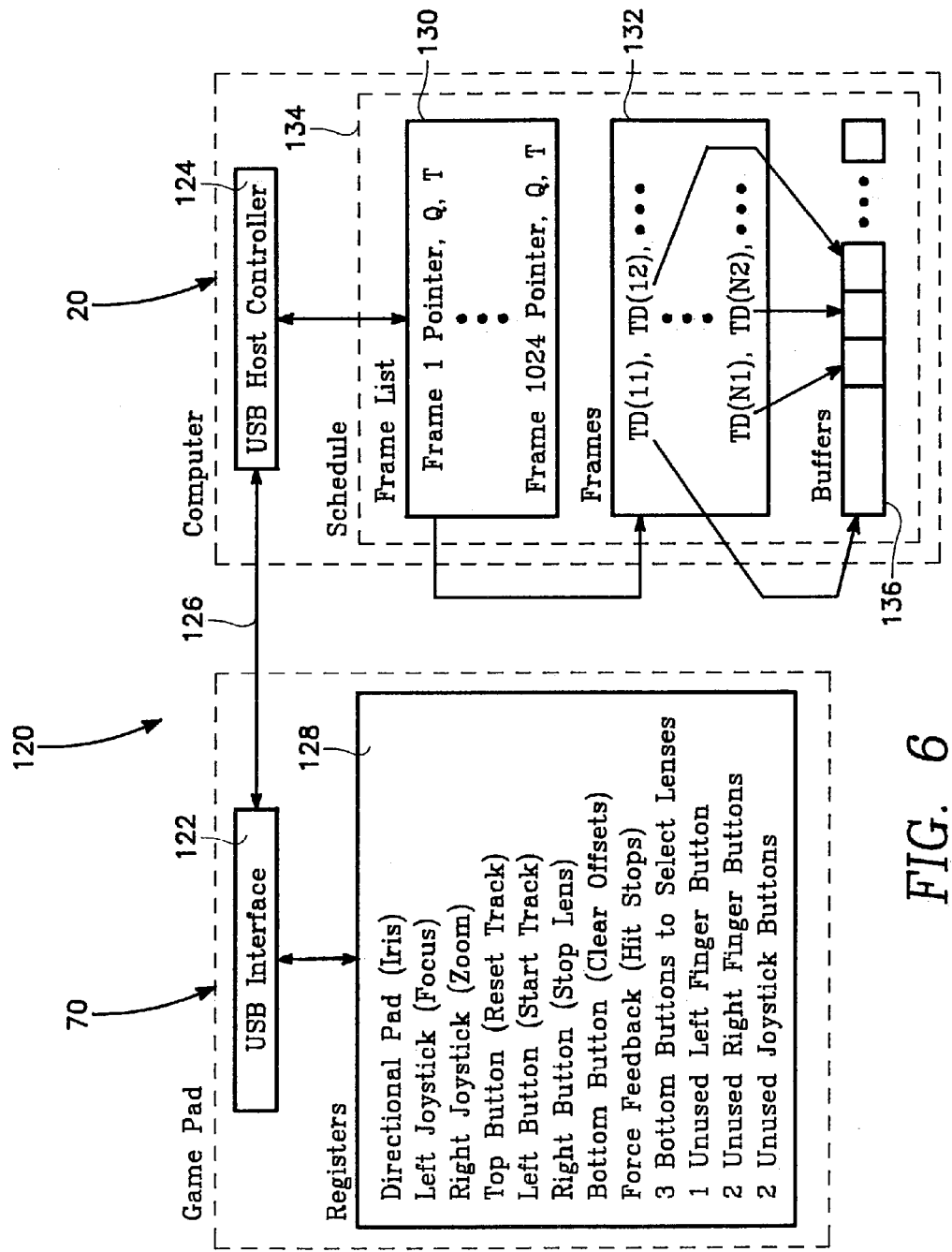
FIG. 6 illustrates the allocated memory for the USB game pad when interfaced to the Auto Focus and Zoom Controller via a Universal Host Controller Interface.
Figure 7A:
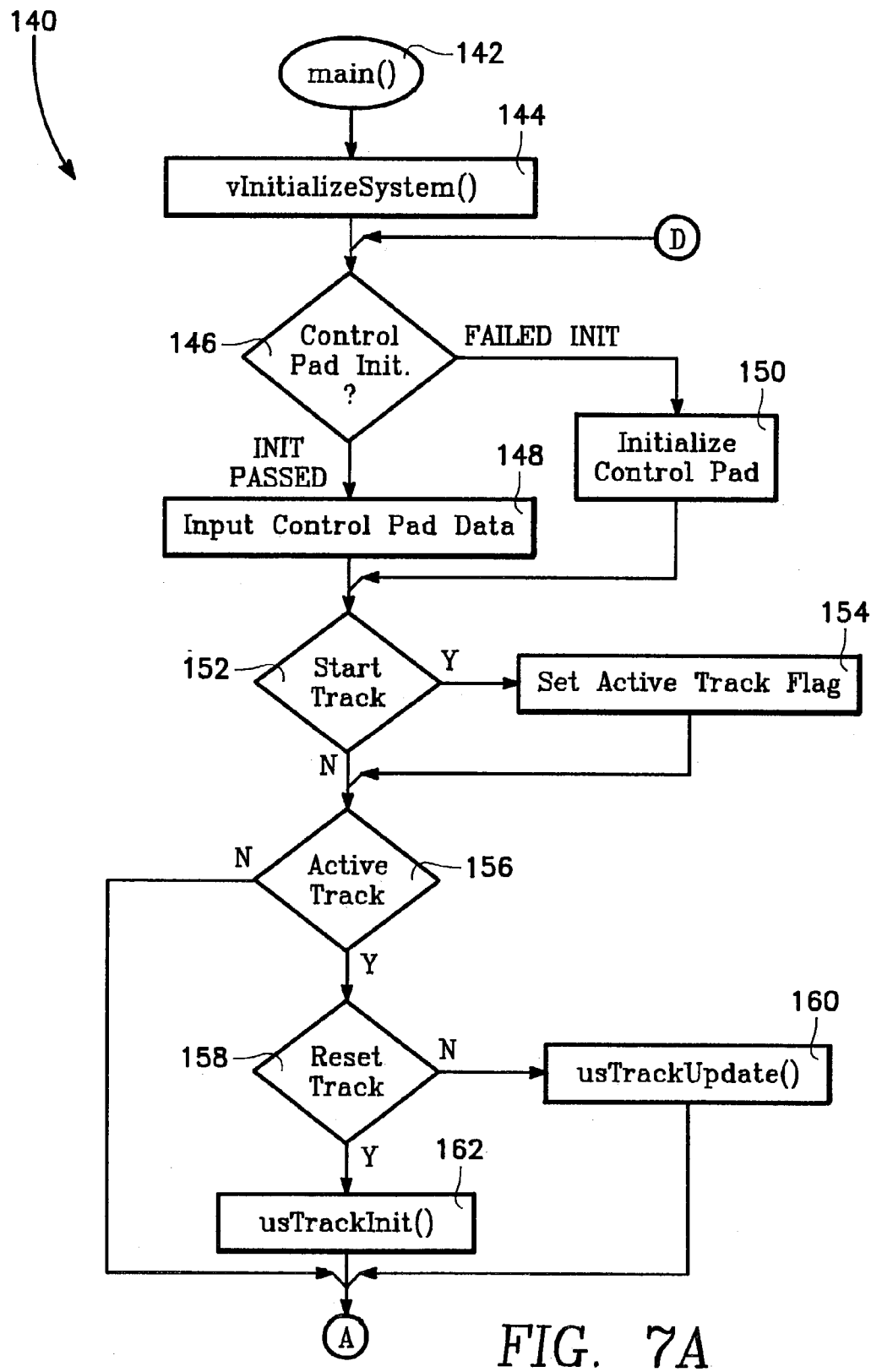
FIGS. 7A–7D illustrates a flow chart for the Auto Focus/Zoom Controller main program which controls the operation of the system depicted in FIG. 1.
Figure 7B:
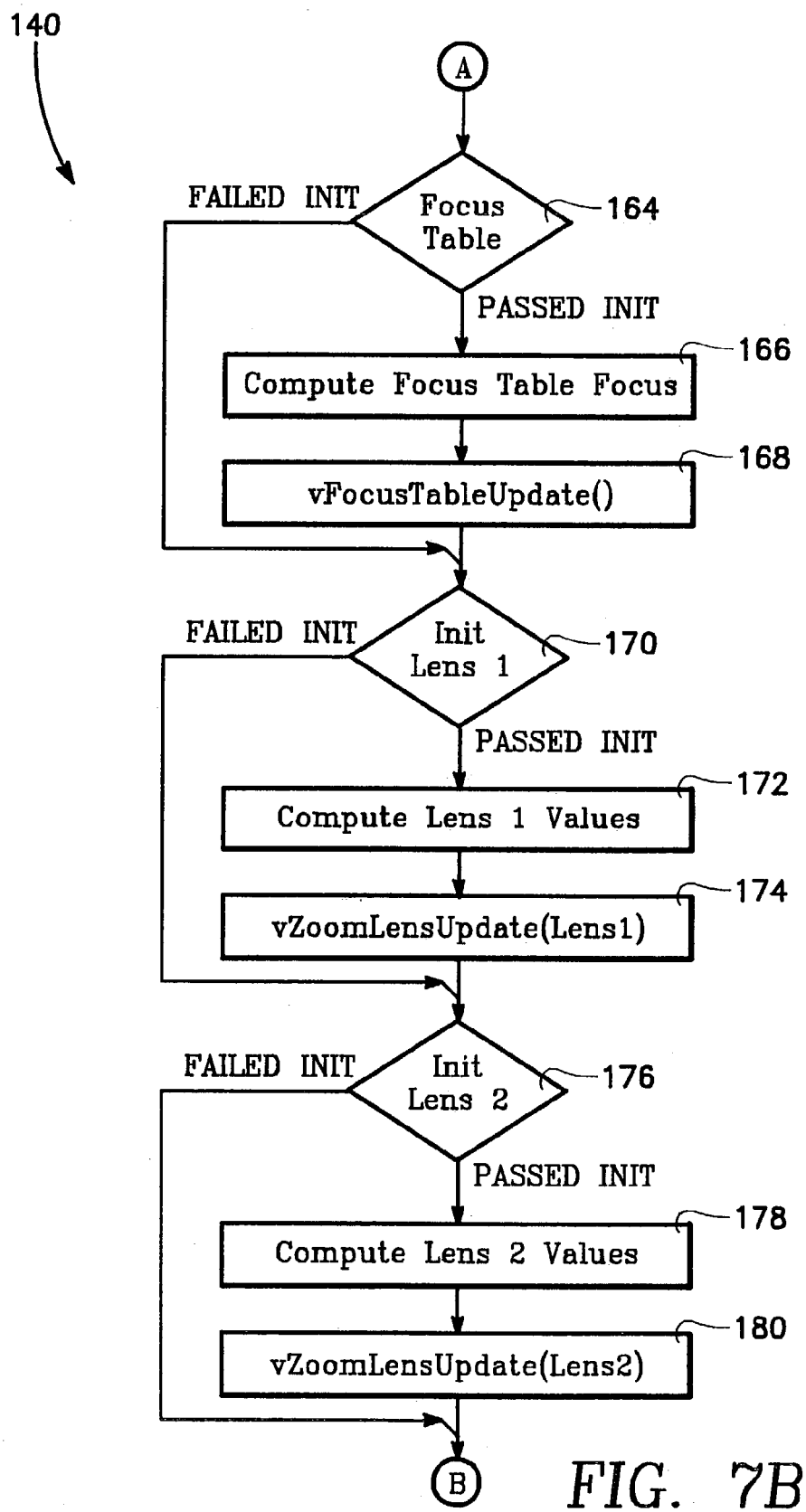
Figure 7C:
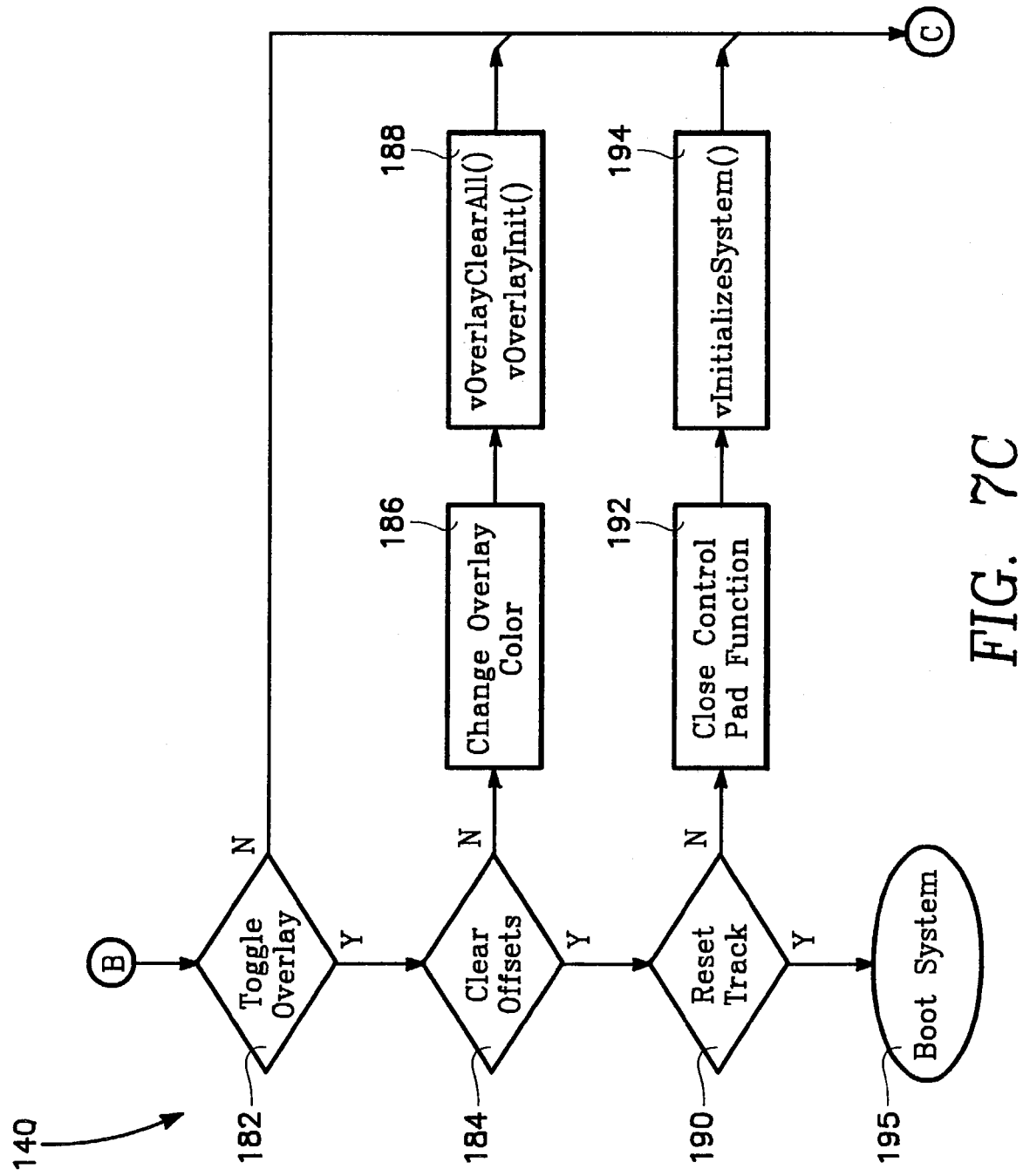
Figure 7D:
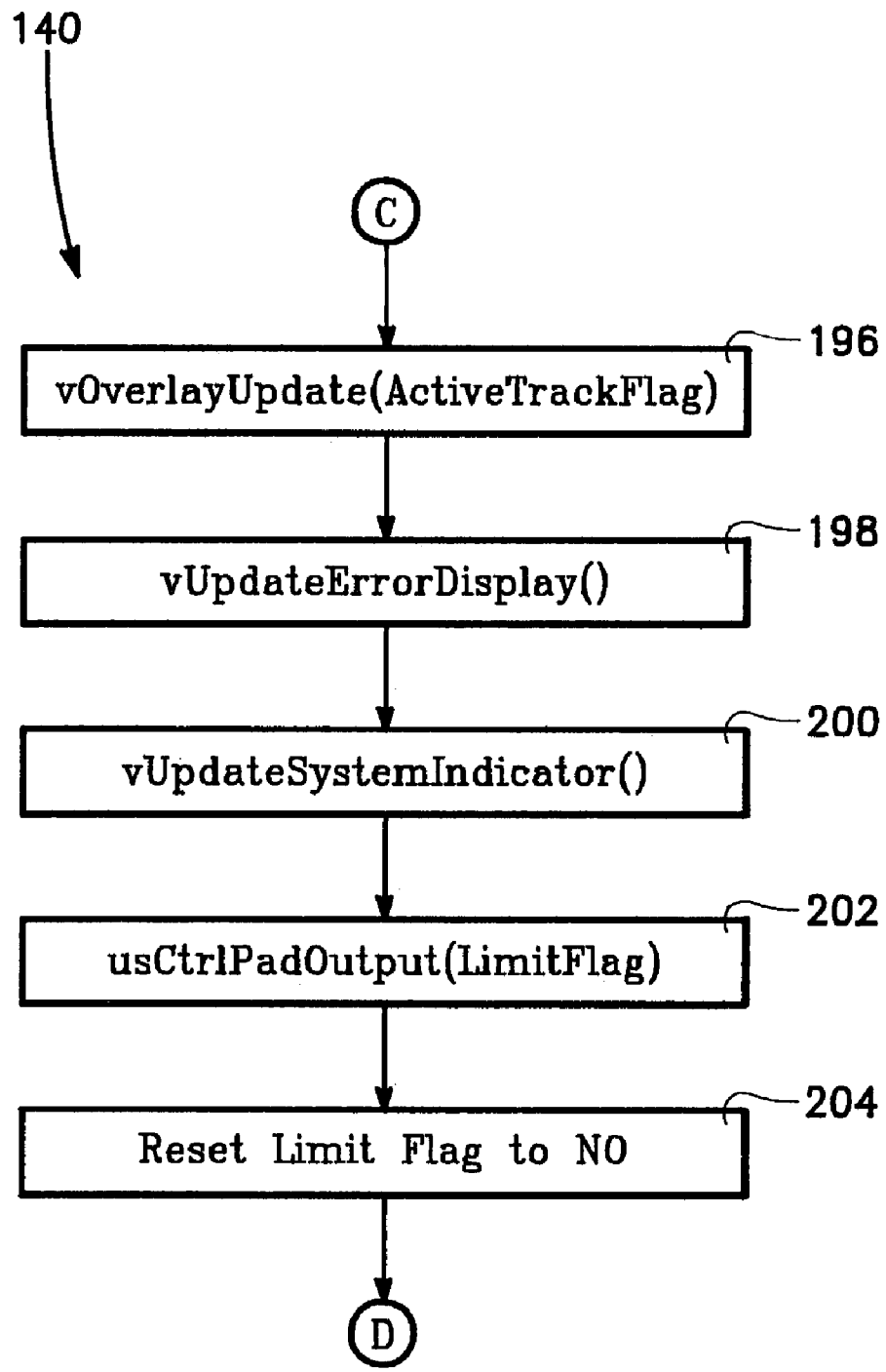

Referring to FIGS. 1 and 6, memory must be allocated and initialized for a Frame Pointer List, a Transfer Descriptor, an Input Data Buffer and an Output Data Buffer. The Frame Pointer List 130 consists of 1024 structured 32-bit pointers that are used by the Universal Host Controller Interface 120 to locate the Transfer Descriptors that describe the USB frames 132 (FIG. 6). This list resides on a real physical 4096-byte memory boundary and its real physical location is saved for the UHCI initialization. The Schedule 134 will sequence through one Frame Pointer every millisecond.

One out of every sixteen Frame Pointers is initialized to point to the real physical location of the one Transfer Descriptor (TD11) needed for the interface. The remaining Frame Pointers are initialized with the terminate bit (T) set which causes no operation performed. This results in a maximum polling rate of once every 16 milliseconds for USB Game Pad transfers.

Data transfers between the USB interface 122 within game pad 70 and the USB host controller 124 occur over the 12 foot game pad cable and the 15 foot extension cable 126. The USB interface 122 is connected to registers 128 within game pad 70. These registers 128 are for the various functions controlled by the game pad 70 which are implemented via the game pad buttons and joysticks illustrated in FIGS. 3 and 4.

A Transfer Descriptor consists of four 32-bit words that describe the type of transfer and point to the real physical location of the data and data buffers as well as the next Transfer Descriptor needed for the transfer. Only one Transfer Descriptor was needed to implement the interface with the USB Game Pad 70. This Transfer Descriptor is dynamically configured to perform both the initialization and the data transfers.

Separate data buffers 136 are allocated to accommodate the maximum size of an input or output data transfer. The real physical location of this allocated memory is saved and used to dynamically configure the Transfer Descriptor during operation.

The Universal Host Controller Interface initialization consists of the following steps:

1) Determine the existence of the UHCI on a PCI bus.
2) Retrieve the I/O address of the UHCI.
3) Enable the UHCI.
4) Initialize the UHCI registers.
5) Test for and attempt a connection with the USB Game Pad.

When the USB Game Pad is detected the remaining initialization of the UHCI and the USB enumeration process are performed as follows:

1) Remaining UHCI initialization
   a) Clear the port Status/Control Register
   b) Reset the port
   c) Enable the port
   d) Set the Frame Number Register to zero (first frame).
   e) Command the interface to run 2) USB Enumeration
   a) Control Transfer to request Device Descriptor (initially in Default State)
   b) Control Transfer to receive Device Descriptor data
   c) Control Transfer to request Device Status (abort Device Descriptor)
   d) Control Transfer to receive Device Status
   e) Control Transfer to set USB Device Address
   f) Control Transfer to receive Device Address Confirmation (now in Address State)
   g) Control Transfer to request Device Descriptor
   f) Control Transfer to receive Device Descriptor
   h) Control Transfer to request Device Configuration Descriptor
   i) Control Transfer to receive Device Configuration Descriptor
   j) Control Transfer to set Device Configuration Descriptor
   k) Control Transfer to receive Device Configuration Confirmation (Configured State)
   l) Control Transfer to request Device Configuration Value
   m) Control Transfer to receive Device Configuration Value If a connection with the USB Game Pad 70 is not established (above step 5) or if the enumeration process fails for some reason another attempt will be attempted when the Auto Focus and Zoom Controller 20 program tries to read data from the USB Game Pad 70.

Referring to FIGS. 1, 7A–7D and 8, there is a shown in FIGS. 7A–7D the main computer software program 140 flow chart (lensctlr.exe flow chart) for controller 20. Upon power up the program begins at main() (program step 142) then proceeds to the initialization subroutine of FIG. 8 (program step 144).

Figure 8:
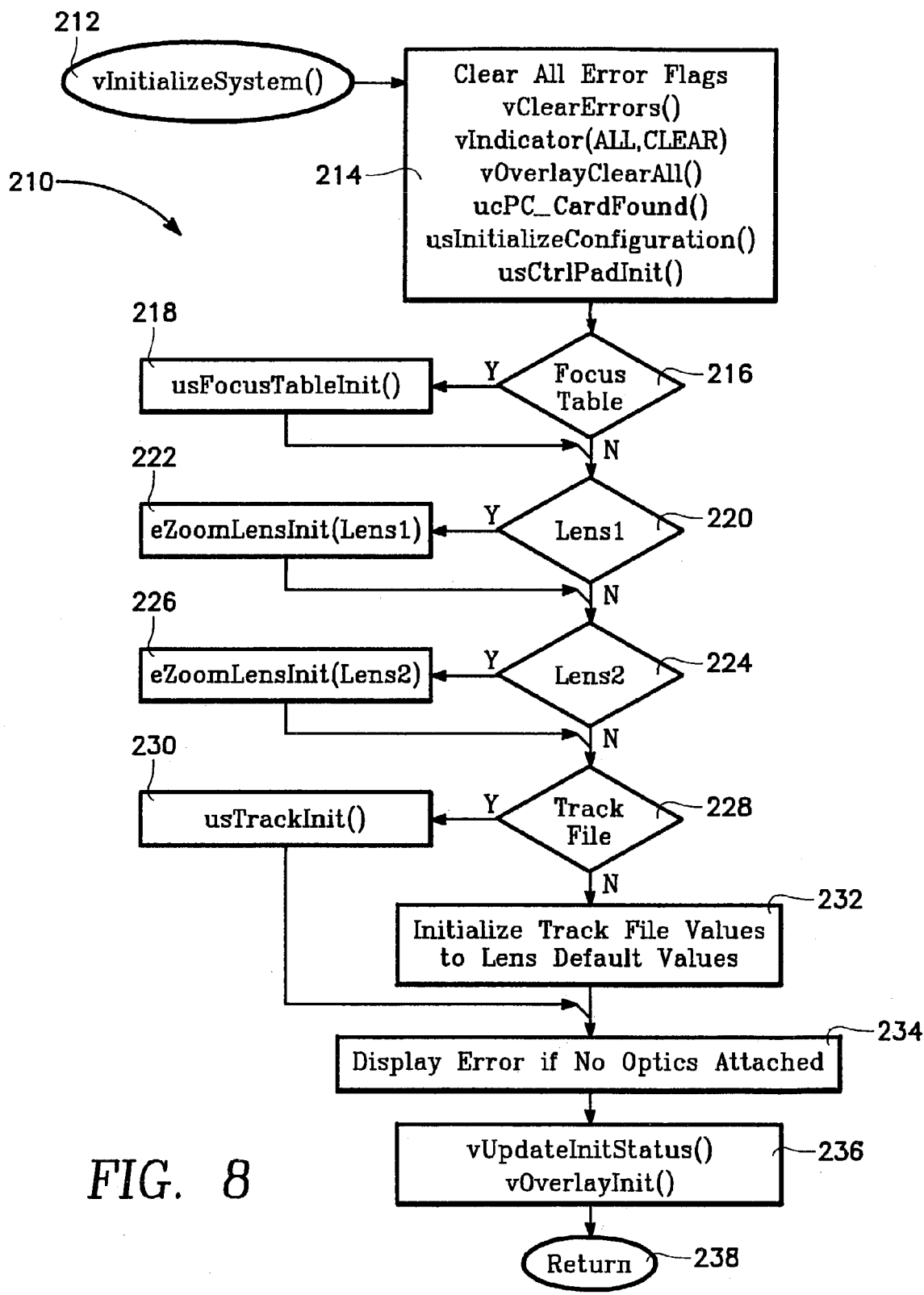
FIG. 8 illustrates a flow chart for the initialize subroutine for the program of FIGS. 7A–7D.

During the initialization subroutine of FIG. 8, the controller 20 will attempt to locate the track file on PC Memory Card 42 (program step 228). If the track file is found, controller 20 will set the lenses to the initial settings as indicated in the file (program step 230).

If the track file is not found, controller 20 will set the lenses to focus at infinity with their widest field-of-view and greatest f-stop (program step 232).

The focus function for the focus tables 30 and 32 are initialized during program steps 216 and 218, the focus, zoom and iris functions for lens system 34 are initialized during program steps 220 and 222, and the focus zoom and iris functions for lens system 38 are initialized during program steps 224 and 226.

During program step 214 error flags are cleared, LED indicator light 62 is cleared and the PC memory card 42 is located.

Program step 234 provides an error message for display if no optical systems are attached to Auto Focus and Zoom Controller 20.

Initialization of overlays occurs during program step 236 and in addition to an update on the initialization status. The software then exits the initialization subroutine (program step 238) and returns to the main program which is illustrated in FIGS. 7A–7D.

During program step 146, the software checks the initialization of the control pad which is generally game pad 70 but may be switch pad 100. If the initialization failed it is tried again in program step 150. Otherwise in step 148 the control pad data is read.

The Start Track button 84 on USB Game Pad 70 (program step 152) is checked to start the automatic control of the Lens Systems 34 and 38 and Focus Tables 30 and 32 based upon the records contained in the track file. The active track flag is tested during program step 154 which indicates whether the Start Track button 84 on USB Game Pad 70 (program step 152) was pressed. If the Start Track button 84 was not pressed the remaining track file functions are skipped.

When the Stop Track button 86 on USB Game Pad 70 is pressed the track file control will pause keeping the lens control functions and the displayed time set to the values contained in the last record read from the track file. Pressing the Start Track button 84 continues automatic control.

The Reset Track button 88 is tested (program step 158), if pressed the software proceeds to program step 162 to restart automatic control of the Lens Systems 34 and 38 and Focus Tables 30 and 32. If automatic control had been paused, pressing the Reset Track button 88 will reset the pointers in the track file to the first record in the file and maintain the pause until activated with the Start Track button 84.

The computer software program proceeds to program steps 164 to test the initialization of the focus tables 30 and 32. If initialized during program step 166, the software computes the focus table focus and a focus table update occurs during program step 168.

During program step 170, the software test the initialization of lens system 34. If initialized, Lens system 34 values are computed during program step 172 including focus, focal length and iris values or settings. During program step 174, an update for the focus, focal length and iris functions are generated for Lens system 34.

For lens system 38, program steps 176, 178 and 180 operate in an identical manner as program steps 170, 172 and 174 operate with respect to lens system 34.

During program step 182, the Toggle Overlay button 92 is monitored by the software. When an operator presses the Toggle Overlay button 92 and the Clear Offsets button 90 is not pressed (program step 184) the computer software will sequence the video overlays from white to black to no overlay (program steps 186 and 188) and back to white again. The function gives the operator the capability to set the overlay for the best viewing against the background in real time.

When an operator presses the Toggle Overlay and the Clear Offsets button 90 (program step 184), and the Reset Track button 86 is not pressed (program step 190) the software clears the offsets input by the operator. The Lens Systems and Focus Table settings will then revert back to the values indicated in the track file.

Program step 192 of the computer software program closes the game pad or switch pad function which allows the program to re-initialize that function in the initialization subroutine of FIG. 8 (program step 194). Pressing the Reset Track button 88 in addition to the Toggle Overlay button 92 and the Reset Track button 86 (program step 190) reboots the entire Auto Focus and Zoom Controller system by invoking the warm boot program (warmboot.com) in the root directory (program step 195).

During program step 196 an overlay update occurs. During program step 198 an error display update occurs. During program step 200 the system indicators, i.e. LEDs 62, 64 and 66 are updated.

During program step 202 the control pad output (game pad vibration) function is called to provide the operator with sensory feedback, based upon the status of the Limit Flag, which indicates that a limit in one of the lens functions (Focus, Focus Length or Iris settings) is reached. Program step 204 resets the Limit Flag to no.

Figure 9A:
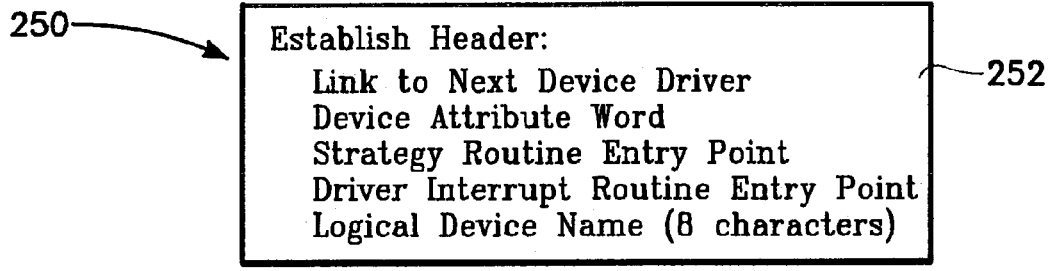
FIGS. 9–24 illustrate flow charts for the USB device driver software which allows the USB game pad to communicate with the Auto Focus and Zoom Controller comprising the present invention.
Figure 9B:
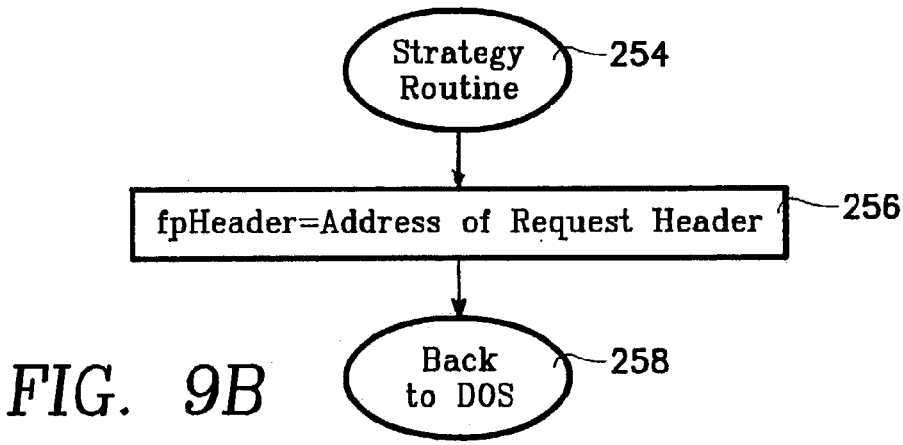
Figure 10A:
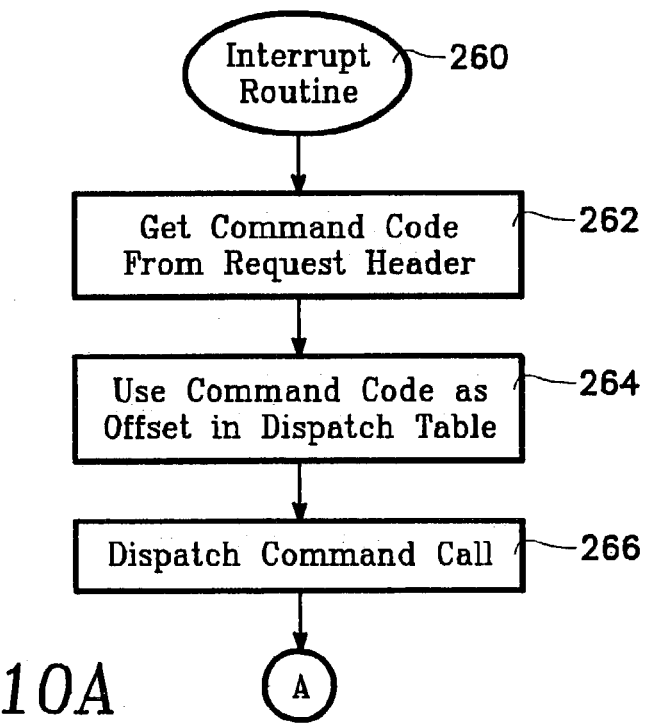
Figure 10B:
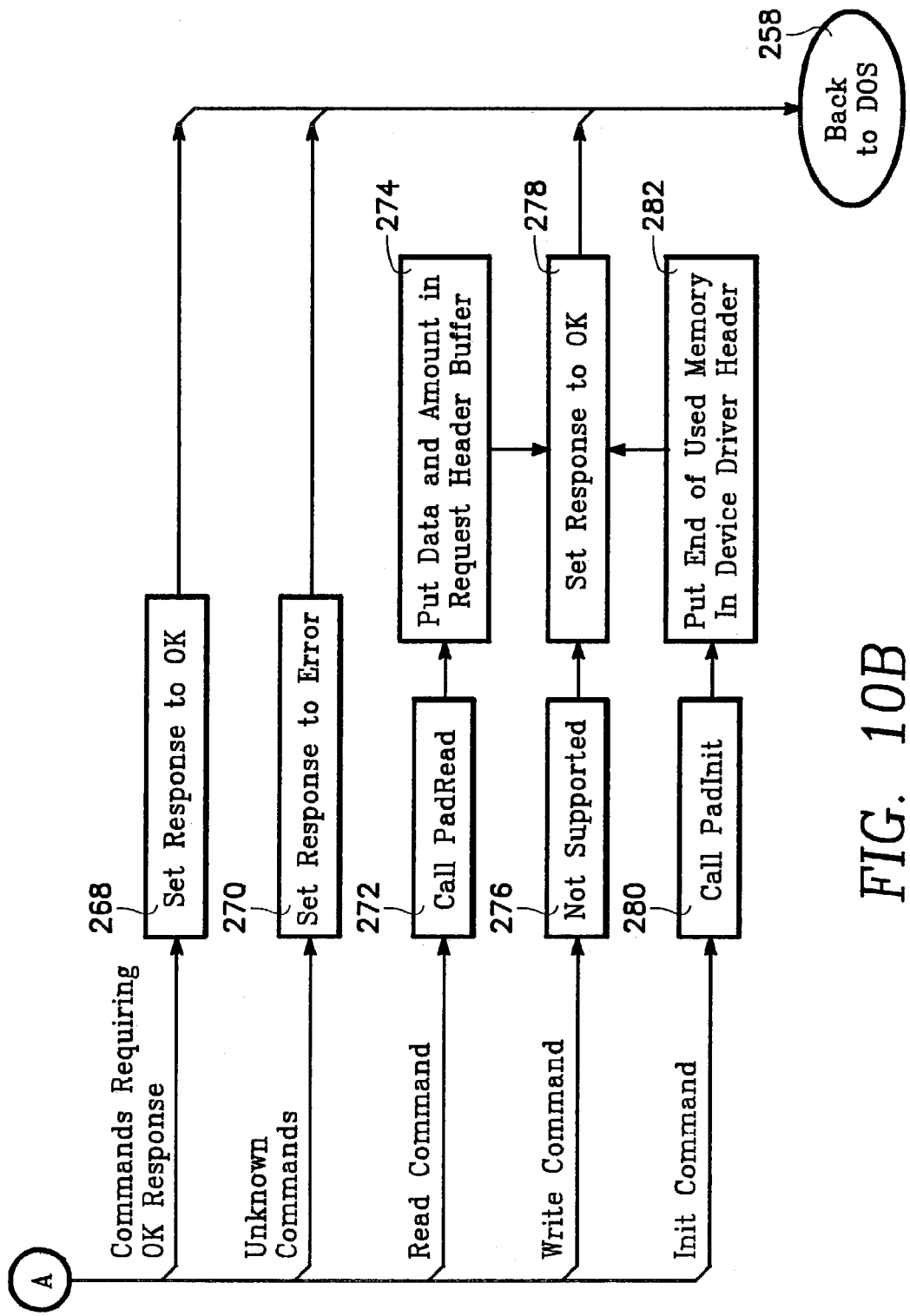

Referring to FIGS. 1, 9A and 9B, device driver software was developed to allow for communications between the game bad 70 and auto focus and zoom controller 20. The software was developed to be compatible with Intel's Universal Host Controller Interface (UHCI). The Universal Host Controller Interface is one of the three primary standards (Universal, Open and Enhanced Host Controller Interface) for a Universal Serial Bus (USB) which is the communications bus for controller 20. UHCI defines how a USB controller talks to a host computer and its operating system which for controller 20 is MS-DOS. Game pad 70 is a USB peripheral designed to connect to a Universal Serial Bus.

Program step 252 (FIG. 9A) of Device Driver Flow Chart 250 establishes a header 252 for the device driver software. Header 252 contains the following: (1) a link to the next device driver, (2) a device driver attribute word, (3) a strategy routine entry point, (4) a driver interrupt routine entry point, and (5) a logic device name which comprises eight characters. The header is compatible with MS-DOS device driver standards.

The flow chart for the strategy routine is illustrated in FIG. 9B in program steps 254, 256 and 258. The strategy routine establishes a header pointer (program step 256) which points to the address of the request header. During program step 258, the strategy routine returns to DOS.

Referring to FIGS. 1, 9A, 9B, 10A and 10B, the device driver computer software next enters the Interrupt routine (program step 260). The entry point for the Interrupt routine was established in program step 252. The Interrupt routine consist get the Command Code from the request header (program step 262), and then use the Command Code as an offset in the dispatch table (program step 264). The Command Code represents commands used in the device driver software including read, write, reset and initialize. The Command Code is an offset into the Dispatch Table which next points to the appropriate routine to implement the command.

Program step 266 implements the dispatch command call which calls the routine to implement the read, the write or the initialize routines within the device driver software.

Program steps 268–282 of the Interrupt routine perform the function of calling the routine identified in the pointer from the Dispatch Table. The Read Command is called in program step 272 and the initialize command is called in program step 280. The write command is not currently supported by the device drive software (program step 276). Provisions are also made within the interrupt routine for miscellaneous commands requiring an OK response (program step 268) and unknown commands which sets the response to error (program step 270).

The Interrupt routine first calls the initialize routine, i.e. Call PadInit (program step 280). Program step 282 sets aside memory for data within the RAM for Auto Focus and Zoom Controller 20. The End of Used Memory is put in the Device Driver Header in program step 282, reserving memory for the device driver in RAM.

Figure 11:
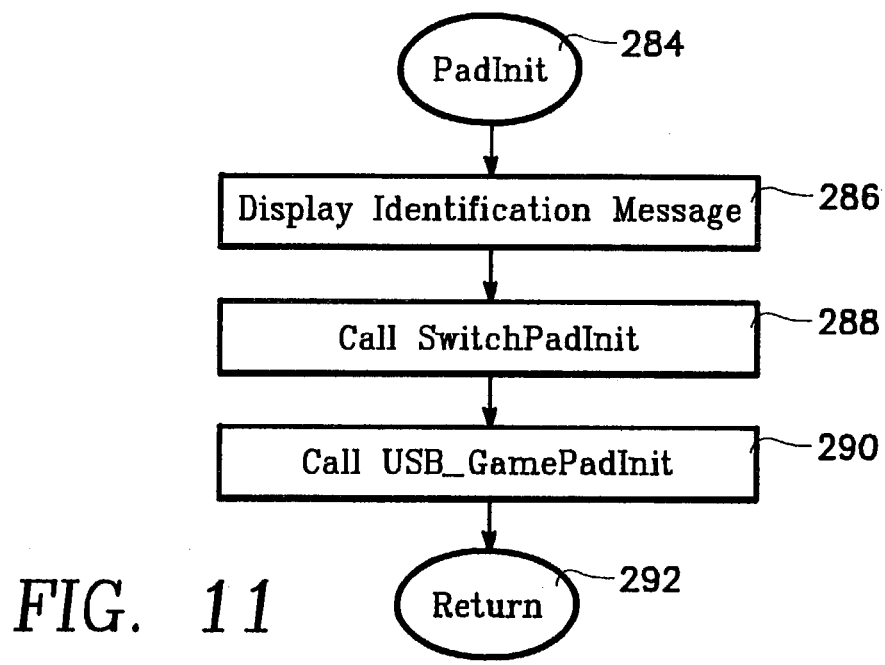

The PadInit routine of FIG. 11 displays an identification message (program step 286) on a computer monitor. A computer monitor is connected only during testing. Both the switch pad and game pad interfaces are then initialized by calling the SwitchPadInit routine (program step 288) and USB_GamePadInit routine (program step 290) respectively.

Figure 12:
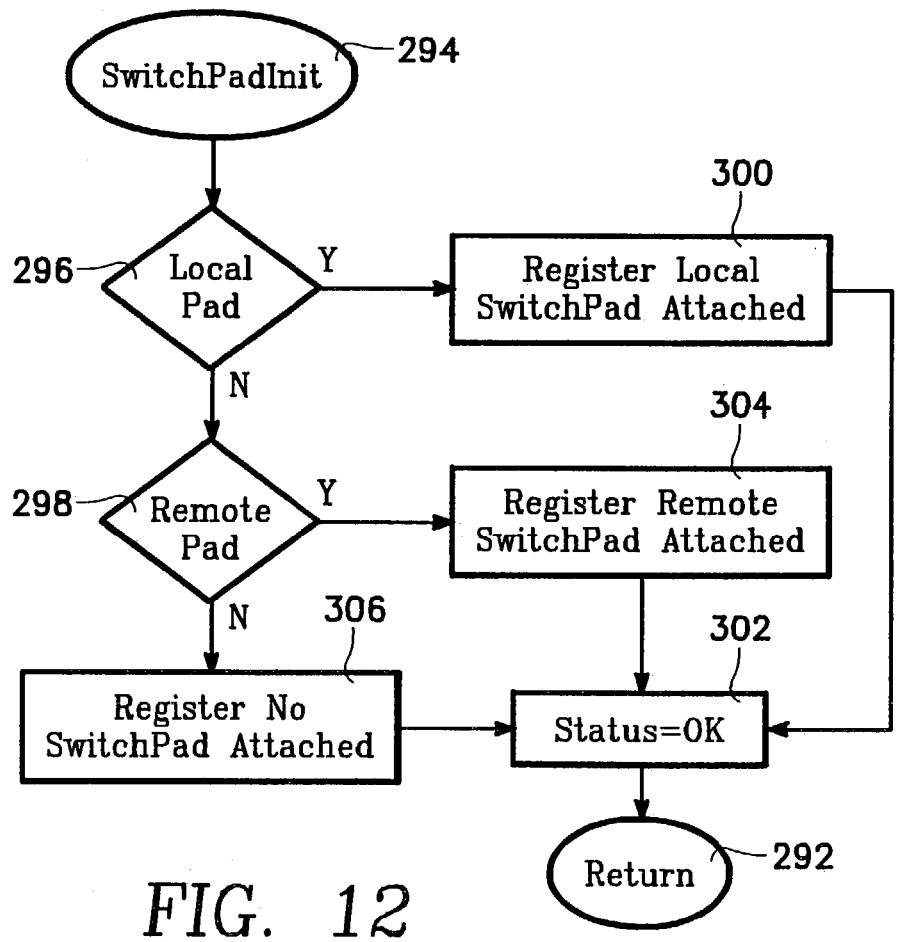

The SwitchPadInit routine (program step 294, FIG. 12) is used to determine whether a local switch pad or a remote switch pad is connected to the Auto Focus and Zoom Controller 20 by examining a pair of bits, a local bit and a remote bit. Whenever the device driver software determines that the local bit is active (program step 296), the software registers a local switch pad is attached (program step 300) and proceeds to set status to OK (program step 302). The local switch pad is defined in the software as switch pad 100 which is illustrated in FIG. 5.

Whenever the device driver software determines that the remote bit is active (program step 298), the software registers a remote switch pad is attached (program step 304) and proceeds to set status to OK (program step 302). The remote switch pad is defined in the software as a switch pad 100 which is used to only initiate the start track function.

Whenever the device driver software determines that there is not a switch pad attached to controller 20, the software registers no switch pad is attached (program step 306) and proceeds to set status to OK (program step 302).

Figure 13:
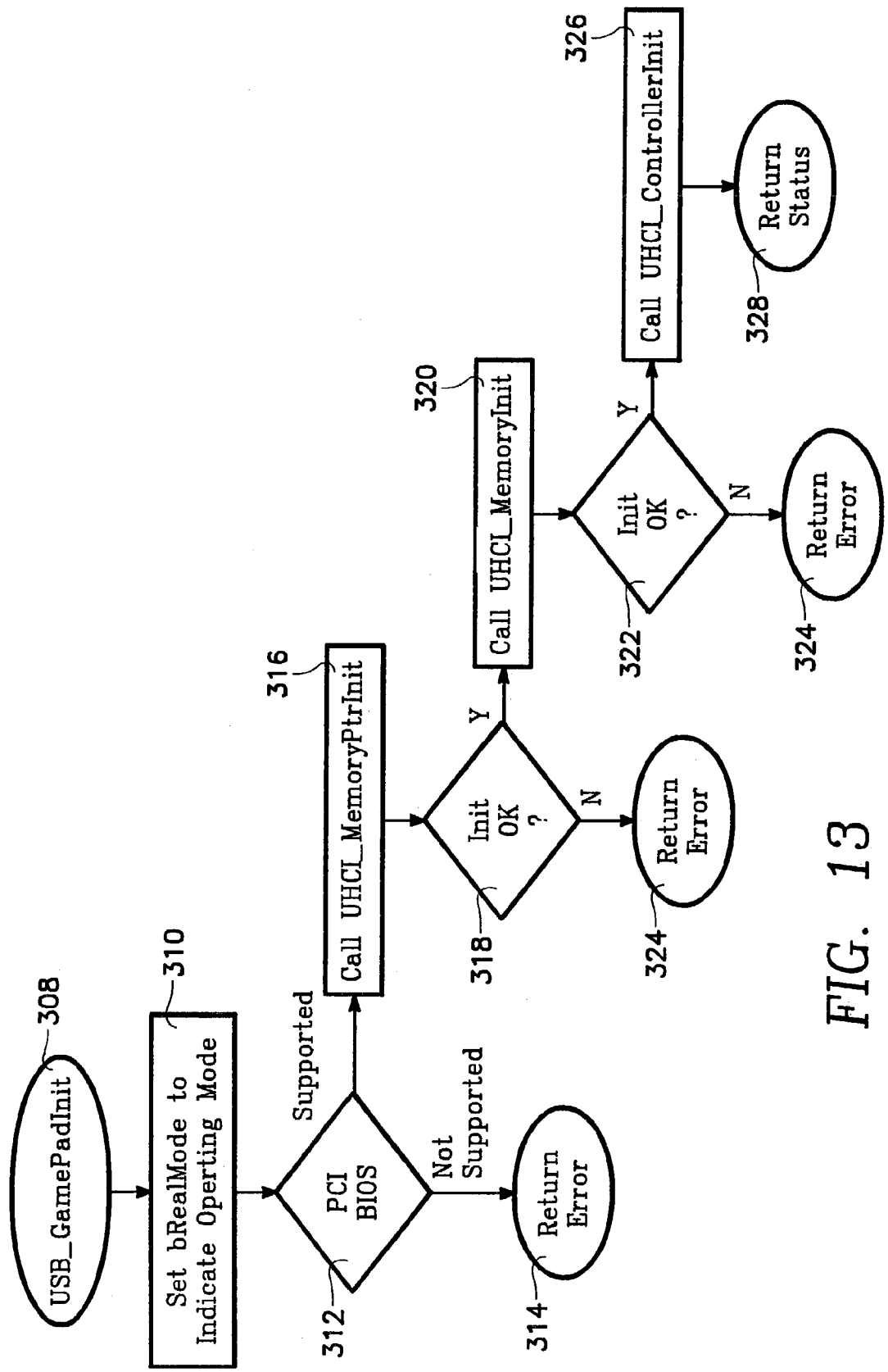
Figure 14:
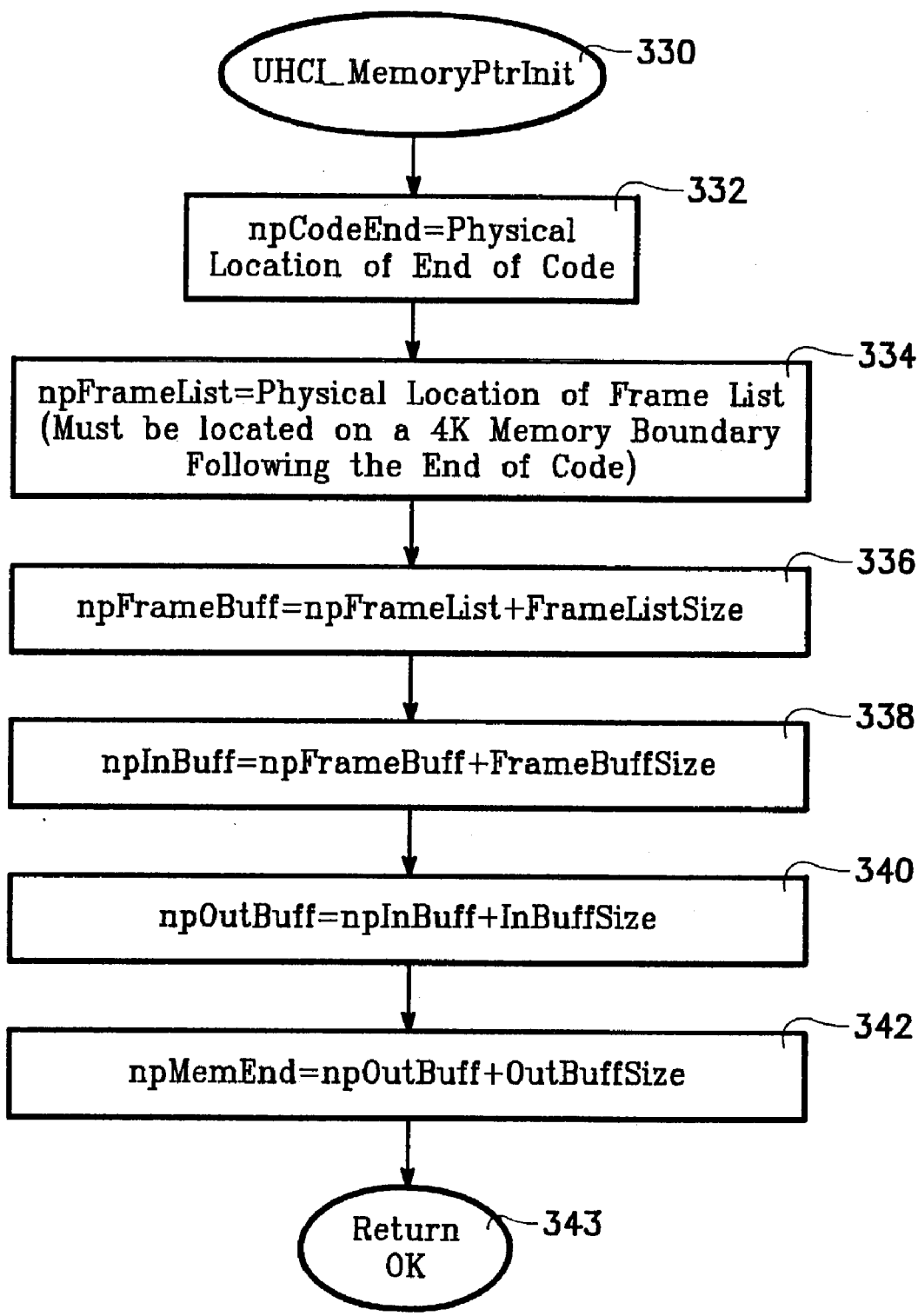

Referring to FIGS. 1, 13 and 14, the USB_GamePadInit routine (program step 308) first must determine whether controller 20 is operating in real mode or in virtual real mode. Real mode means that an address in the program is a physical address in memory. Virtual real mode means that the address in the program is not a physical address in memory, but a virtual representation of the physical address in memory which is translated by the computer system which is controller 20.

The device drivers for the PCMCIA memory card 42 within controller 20 establish virtual real mode as the mode of operation. This necessitates the use of device driver software which operates in virtual real mode to implement the game pad through the Universal Serial Bus (program step 310). A routine is also provided that returns the real physical address in memory whenever there is a need for this memory address.

After the device driver software determines the operating mode (program step 310), the software determines whether a PCI BIOS is supported (program step 312). Since the USB controllers reside on the PCI bus, and functions need to be implemented via the PCI bus, the PCI BIOS must be supported, otherwise the software program step 314 will return an error message.

When the PCI BIOS is supported the UHCI_MemoryPtrInit routine is called (program step 316) and the software proceeds to the flow chart illustrated in FIG. 14. Program step 330 is the beginning of the UHCI_MemoryPtrInit routine.

During program step 332 the physical location of the end of code in the RAM memory is established. Program step 334 establishes the physical location of the frame list within the RAM memory. The frame list is required for USB access and comprises a list of 1024 pointers for each of the 1024 different frames. The frame list is required whenever a peripheral such as the USB game pad 70 is communicating with a computer via the universal serial bus. The physical location of the frame list (which requires 4 K of RAM memory) follows the end of code.

The frame buffer (program step 336) follows the frame list, The input buffer (program step 338) follows the frame list, the output buffer (program step 340) follows the input buffer and the end of memory used by the device driver follows the output buffer (program step 342).

The allocation of RAM memory and the initialization for the frame pointer list, the input data buffer and the output data buffer are depicted in FIG. 6 of the drawings.

The memory allocation illustrated in the Flow Chart of FIG. 14 was designed for simplicity and to minimize the use of memory space in RAM.

When the allocation of memory is complete (program step 343), the software returns to the flow chart of FIG. 13 indicating that the allocation was performed (program step 318). The software next enters the UHCI_MemoryInit (program step 326).

When the device drivers fails to initialize, the software returns an error (program step 324) indicating the device driver failed to initialize.

When the UHCI_MemoryInit routine is complete the software returns to program step 322 indicating initialization was OK and proceeds to program step 326. When an error occurs in the UHCI_MemoryInit routine, the software returns an error (program step 324) indicating the device driver failed to initialize.

Figure 15:
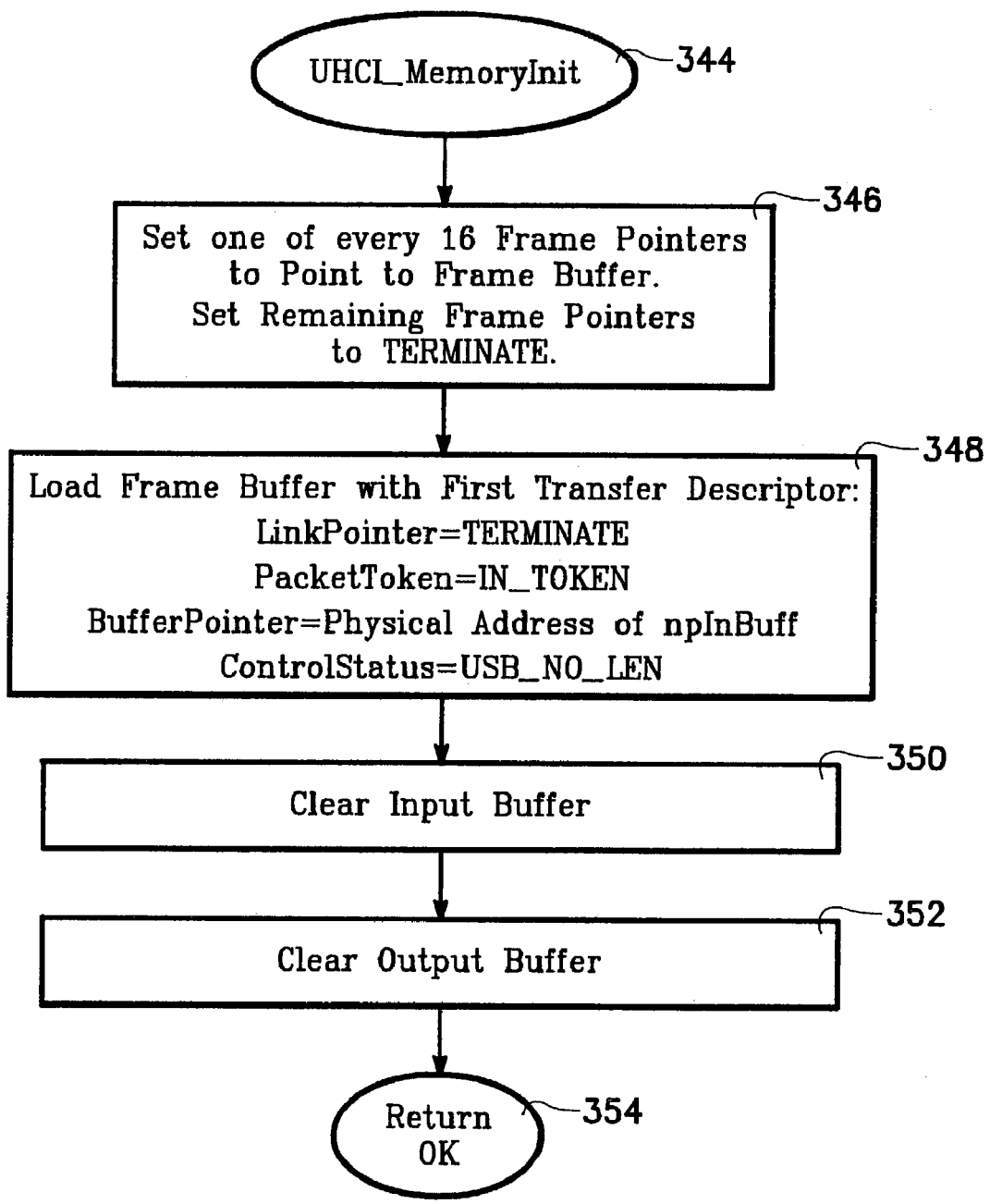

Referring to FIGS. 1, 13 and 15, when the software proceeds to the UHCI_MemoryInit routine (program step 344), the software establishes the contents of the frame list. The frame pointers, which are 32 bits, are pointers which point to a frame buffer to implement a protocol or a frame transaction. Each frame comprises one or more transfer descriptors (FIG. 6) to implement the transaction for the frame.

The UHCI controller (depicted as controller 124 in FIG. 6) accesses a frame pointer once every millisecond requiring that the transaction to be completed within the one millisecond time period. Program step 346 sets only one of every sixteen frame pointers to point to the Frame Buffer. USB game pad 70 is a slow operating device which requires at least one millisecond to complete a transaction. The remaining frame pointers are set to terminate by setting the least significant bit of the frame pointer to a one. When the least significant bit of the frame pointer is set to zero, the frame pointer will point to a frame.

The frame pointers that are active (least significant bit set to zero) point to only one buffer (program step 348). This buffer has four thirty two bit words consisting of a Link-Pointer, a PacketToken, a BufferPointer and a ControlStatus. The LinkPointer is set to TERMINATE, the PacketToken is set to IN_TOKEN (initial condition) for initialization only and changes subsequent thereto, the Buffer Pointer is set to the physical address of the input buffer and the ControlStatus is set initially to no data length. The LinkPointer 32-bit word remains the same after being initialized by the software, while the PacketToken Buffer Pointer and ControlStatus 32-bit words change after initialization by the software.

The software next clears the input buffer (program step 350), the output buffer (program step 352) and returns an OK (program step 354) returning to the USB_GamePadInit routine.

Figure 16:
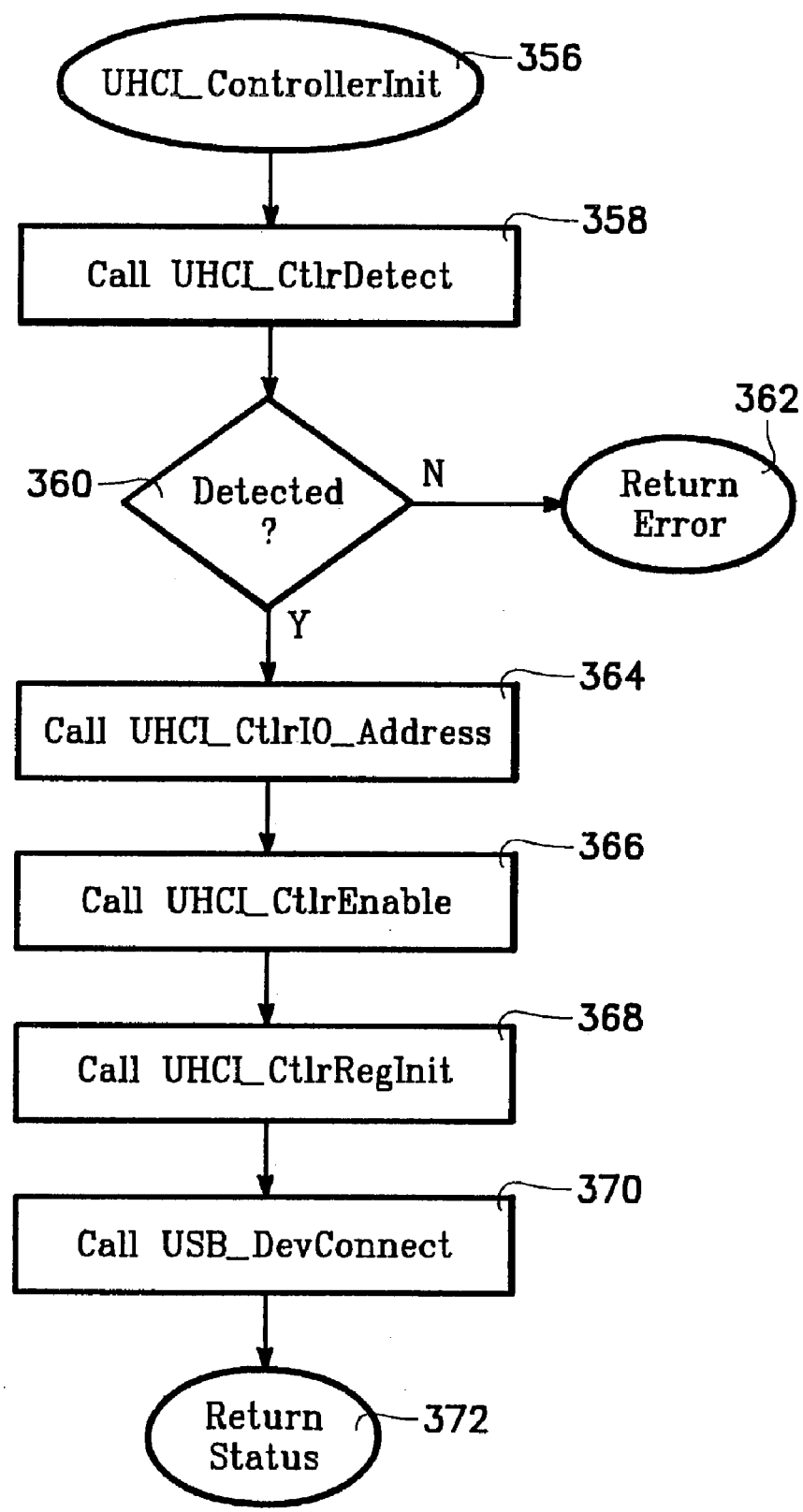

Referring to FIGS. 1, 13 and 16, during program step 326, the computer software calls the UHCI_ControllerInit routine (program step 356). The UHCI Controller 124 (FIG. 6) controls the dialog on the Universal Serial Bus. The software then calls a routine UHCI_CtlrDetect (program step 358) to detect the presence of controller 124. If controller 124 is not present or there is a failure to locate USB support within controller 20, a return error is indicated (program step 362). There are also other controller types such as the OHCI and EHCI controllers which would result in the return error provided by program step 362.

Whenever the UHCI controller 124 is detected and supported by controller 20, the software proceeds to program step 364 and calls UHCI_CtlrIO_Address routine which determines the I/O address for the controller 124 on the PCI bus. This address is a variable address which could change every time the controller 20 powers up.

The UHCI_CtlrEnable routine enables controller 124 (program step 366), the UHCI_CtlrRegInit routine is called (program step 368), and the USB_DevConnect routine is called to determine if there is a USB device connected to controller 20 (program step 370).

During program step 358, a PCI BIOS command is issued and the controller type is returned and then a test is performed to determine if the controller is a UHCI controller 124. Similarly, during program step 364 a PCI BIOS command is issued which results in a return of the physical I/O location. During program step 366 a PCI BIOS command is issued to the controller 124 to enable controller 124.

Figure 17:
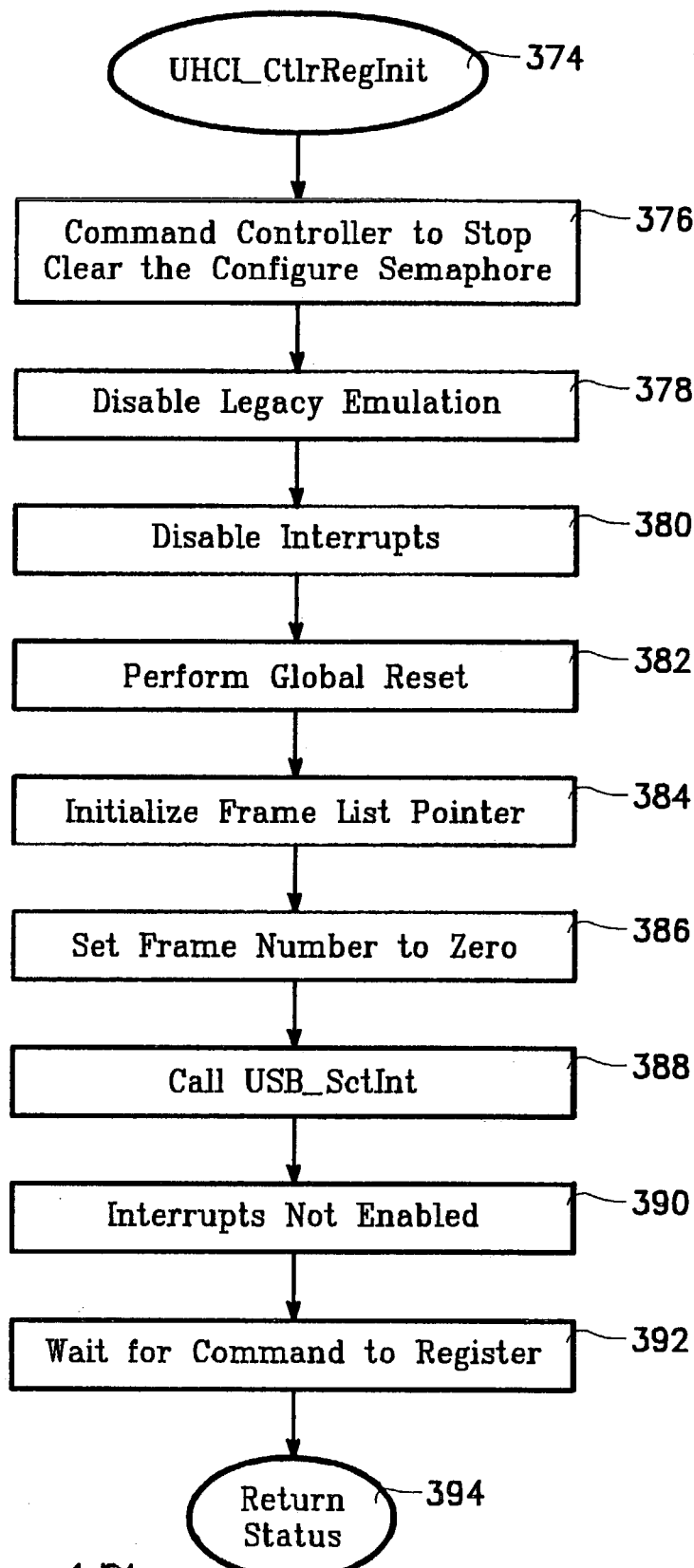

Referring to FIGS. 1, 6, 16 and 17, during program step 368 the software enters the UHCI_CtrlRegInit routine 374 illustrated in FIG. 17. Program step 376 commands controller 124 to stop and clear the configure semaphore flag. Program step 378 disables the legacy emulation which are commands issued to allow the user to access a mouse and key board. Program step 380 disables interrupts, program step 382 performs a global reset in controller 124, and program step 384 initializes frame list pointer which is a register in controller 124. The frame list pointer initializes to the physical address location of the frame list in RAM which is the mechanism by which controller 124 determines the location of the frame list and its 1024 frame pointers.

Program step 386 sets the frame number to zero setting a register within controller 124 to zero. This register counts from 0 to 1024.

Program step 388 calls a USB_SetInt routine which is a routine to process interrupts issued by controller 124. Program step 390 disables this routine since the interrupts are not being used by the software.

Program step 392 provides for a delay to allow for the completion of program steps 382, 384, 386 and 388. Program step 394 returns to the flow chart of FIG. 16.

Referring to FIGS. 1, 6, 16 and 18, the software enters the USB_DevConnect routine during program step 396 which determines whether game pad 70 is connected to the Auto Focus and Zoom Controller 20. Program step 398 gets a connection status from a status register within USB controller 124. Whenever there is no connection of game pad 70 to the controller 20, a check is made to determine whether there is a change from the previous test for the connection status of game pad 70 (program step 402). When there is no change in status, i.e. the previous test indicated the game pad 70 was not connected to controller 20, the software proceeds to program 406 returning to the software illustrated in FIG. 16. When there is a change in status, i.e. the previous test indicated the game pad 70 was connected to controller 20, the software proceeds to program step 404 changing the status register to indicate a no connection status for game pad 70 before to returning to the flow chart illustrated in FIG. 16.

When there is a connection (program step 400) either to port zero or port one (USB1 or USB2 on panel 60, FIG. 2), and there is no change in status the software proceeds to program step 406.

When there is a connection (program step 400) either to port zero or port one (USB1 or USB2 on panel 60, FIG. 2), and there is a change in status (the previous test did not detect a connection for the game pad 70) the software proceeds to program step 410.

Program step 410 clears the port status of port zero or port one, program step 412 resets the port, which is either port zero or port one and program step 414 enables the port, which is either port zero or port one. The frame number is set equal zero during program step 418, which is identical to program step 386 which also sets the frame number to zero.

The program step 418 test is to determine if port one or port two is enabled depending on which port game pad 70 is connected to. If neither port is enabled, an error message is returned (program step 420). When the port having game pad 70 connected to it is enabled, program step 422 commands UHCI controller 124 to run activating the interface between controller 124 and USB bus 126.

Program step 424 calls an enumeration routine USB_Enumeration which is specific to the USB bus. It comprises a set of request and transactions that are implemented across the USB bus to allow for communications with a USB device which is game pad 20. Whenever an enumeration is implemented the software proceeds from program step 426 to program step 428 to register a connection of the USB device (program step 428) and return an OK (program step 406). Whenever an enumeration does not occur the software returns an error (program step 420).

Figure 18:
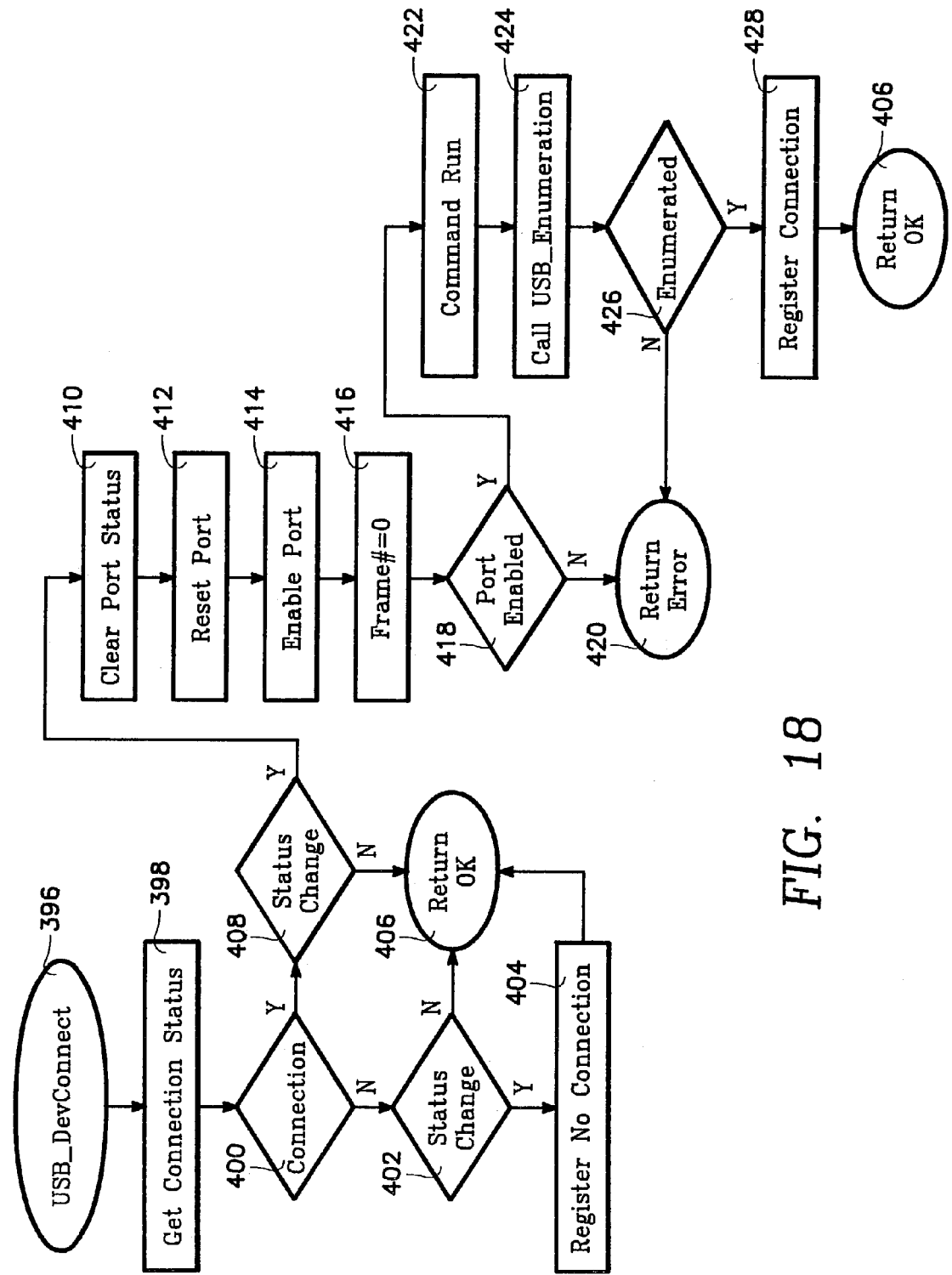
Figure 19:
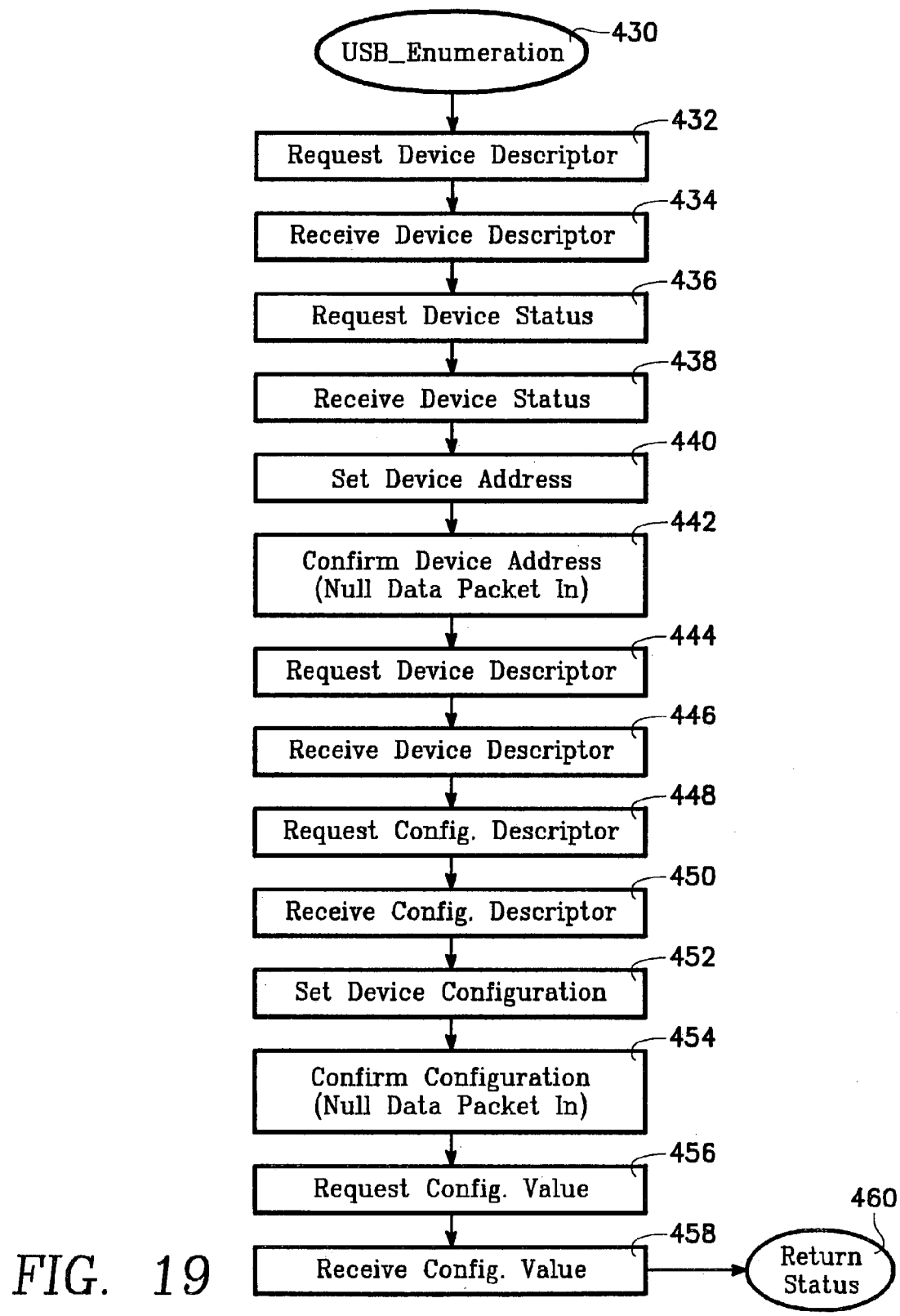

Referring to FIGS. 1, 6, 16, 18 and 19, program step 430 begins the USB_Enumeration routine which was called by program step 424 of FIG. 18. Program step 432 requests the device descriptor for the USB game pad 70, followed by a command to receive the device descriptor. Program step 436 requests the device status for the USB game pad 70, followed by a command to receive the device status. The device address for game pad 70 is set during program step 440. The device address for game pad 70 is confirmed during program step 442 using a null data packet input having a data size of zero.

The device descriptor for game pad 70 is again requested (program step 444), followed by a command to read the device descriptor (program step 446). The first request is to determine the size in bytes for a transaction on the USB bus for game pad 70, which is eight-bytes of eight bit words. The second request is to read the entire device descriptor.

During program step 448, the software requests the configuration descriptor, which is the configuration for game pad 70. Program step 450 issues a command to receive the configuration descriptor for the USB game pad 70.

Program step 452 sets the device configuration to configuration one which is the only configuration for game pad 70. Configuration one is confirmed by using a null data packet input.

Program step 456 requests the configuration value followed by a command to receive the configuration value (program step 458) and a return status (program step 460).

Referring to FIGS. 1, 10A, 10B, 18, 20, 21, the main program for Auto Focus and Zoom Controller 20 includes a routine which has the Logical Device Name of the device driver and also issues a file open command. The file open command establishes communications with the device driver.

Figure 20:
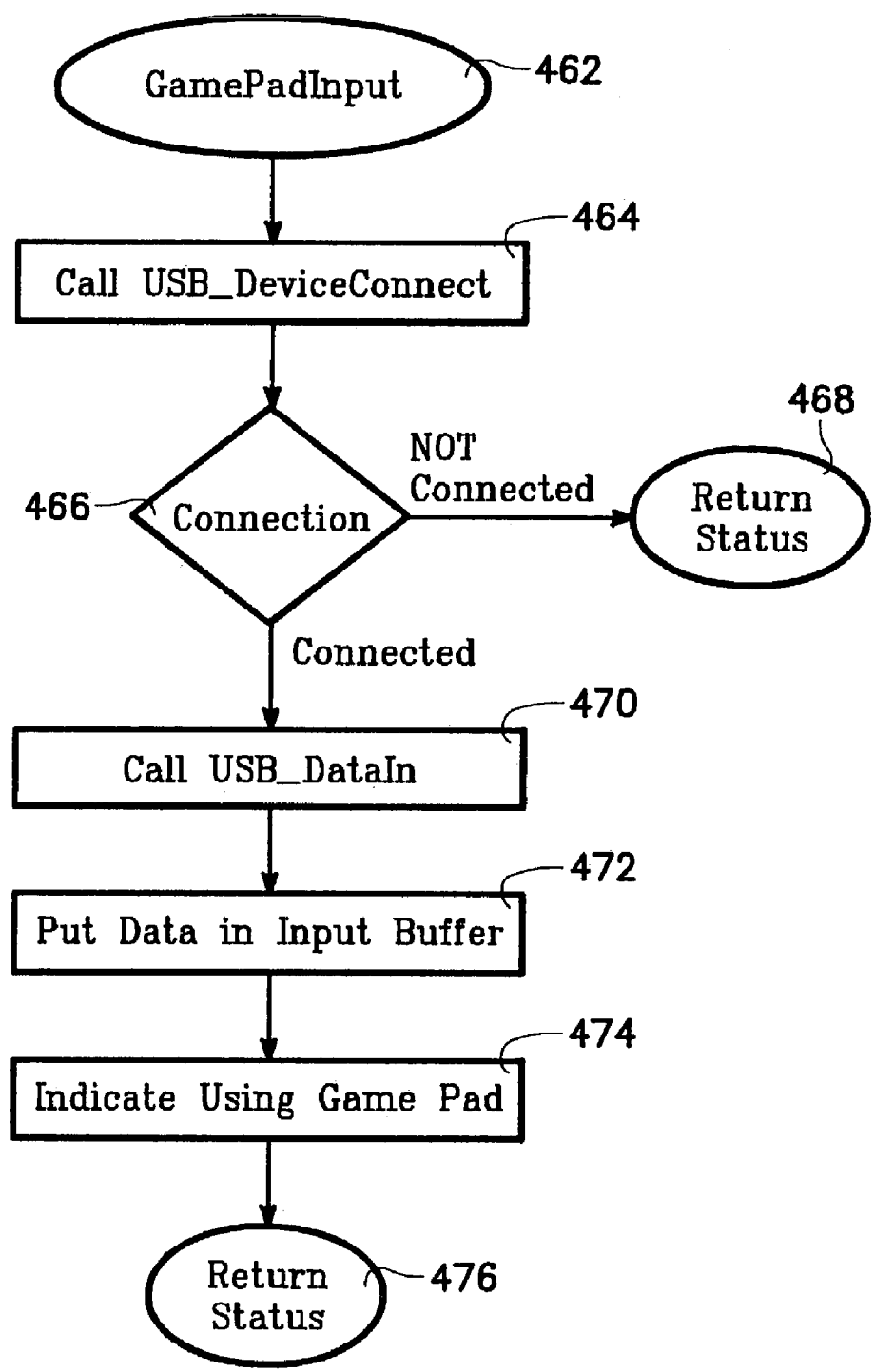
Figure 21:
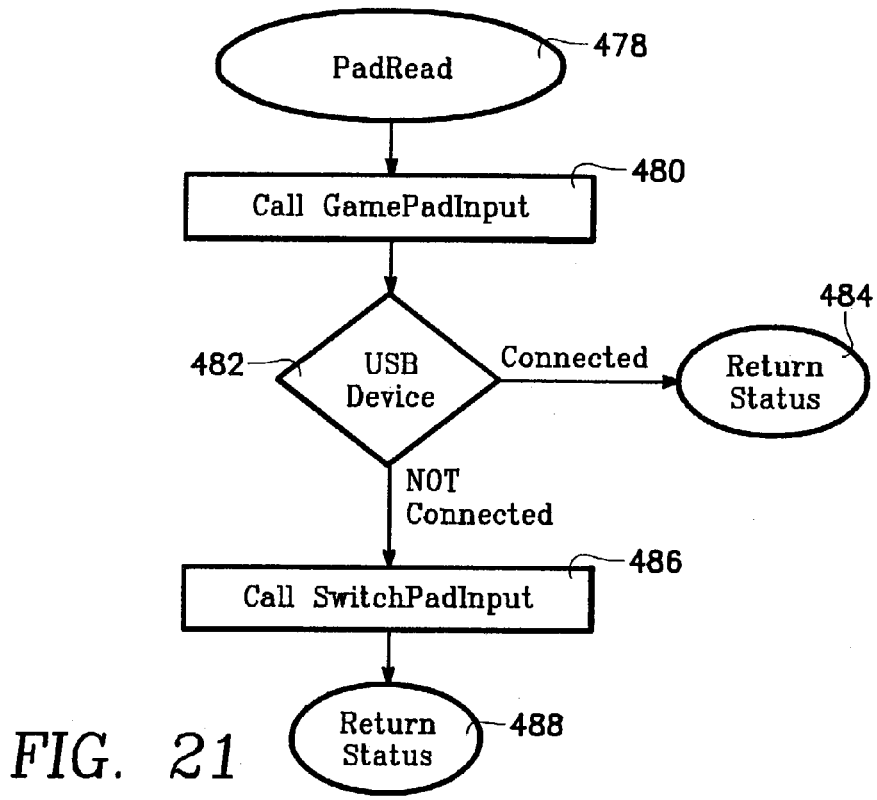

The software enters the interrupt routine (program step 260) and issues a read command which calls the PadRead routine (program step 272). The PadRead routine is entered via program step 478 (FIG. 21). During program step 480, the software calls the GamePadInput routine (program step 462) which is illustrated in FIG. 20. Program step 464 calls the USB_DeviceConnect Routine of FIG. 18 to determine if the USB Game Pad 70 is connected to controller 20. When there is a connection, i.e. the USB Game Pad 70 is connected to controller 20 (program step 482). the status that is returned is the result of the GamePadInput routine.

When the USB game pad 70 is not connected to the Auto Focus and Zoom Controller 20, the software proceeds to program step 486 which calls the SwitchPadInput routine (program step 486). During normal operation either the switch pad 100 or the game pad 70 will be connected to auto focus and zoom controller 20. Program step 488 will return a status which indicates a connection of the switch pad 100 (program step 488).

The GamePadInput routine (program step 462) calls the USB_DeviceConnect routine illustrated in FIG. 18 to determine if the USB Game Pad 70 is connected to controller 20 (program step 464). When the game pad 70 is not connected to controller 20 a return status indicating no connection occurs (program step 468). When the USB game pad 70 is connected to the controller 20, the software calls the USB_DataIn routine (program step 470). Data is then transferred from the USB game pad 70 to the input buffer which is one of the buffers 136 illustrated in FIG. 6. Program step 474 indicates that USB game pad 70 is being used to control the focus, zoom and other functions of Auto Focus and Zoom Controller 20. When a remote bit and a local bit are both set the game pad is in use, when the local bit is set the switch pad is in use and when the remote bit is set a remote switch is in use. A return status occurs during program step 476.

Figure 22:
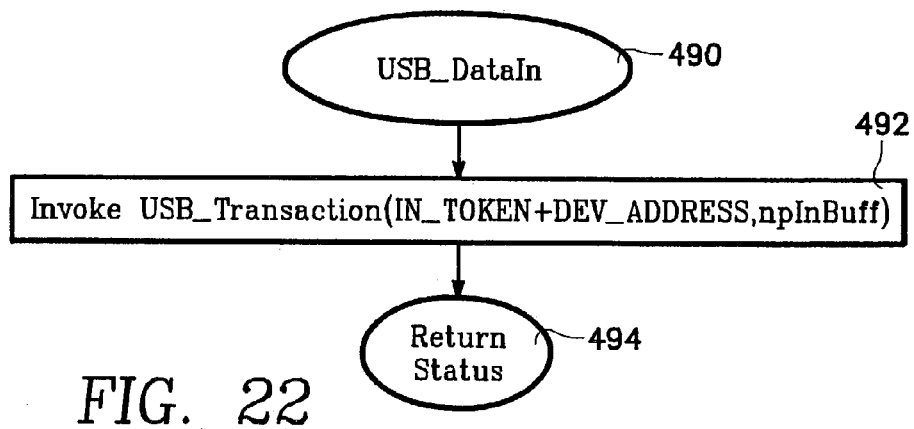
Figure 23:
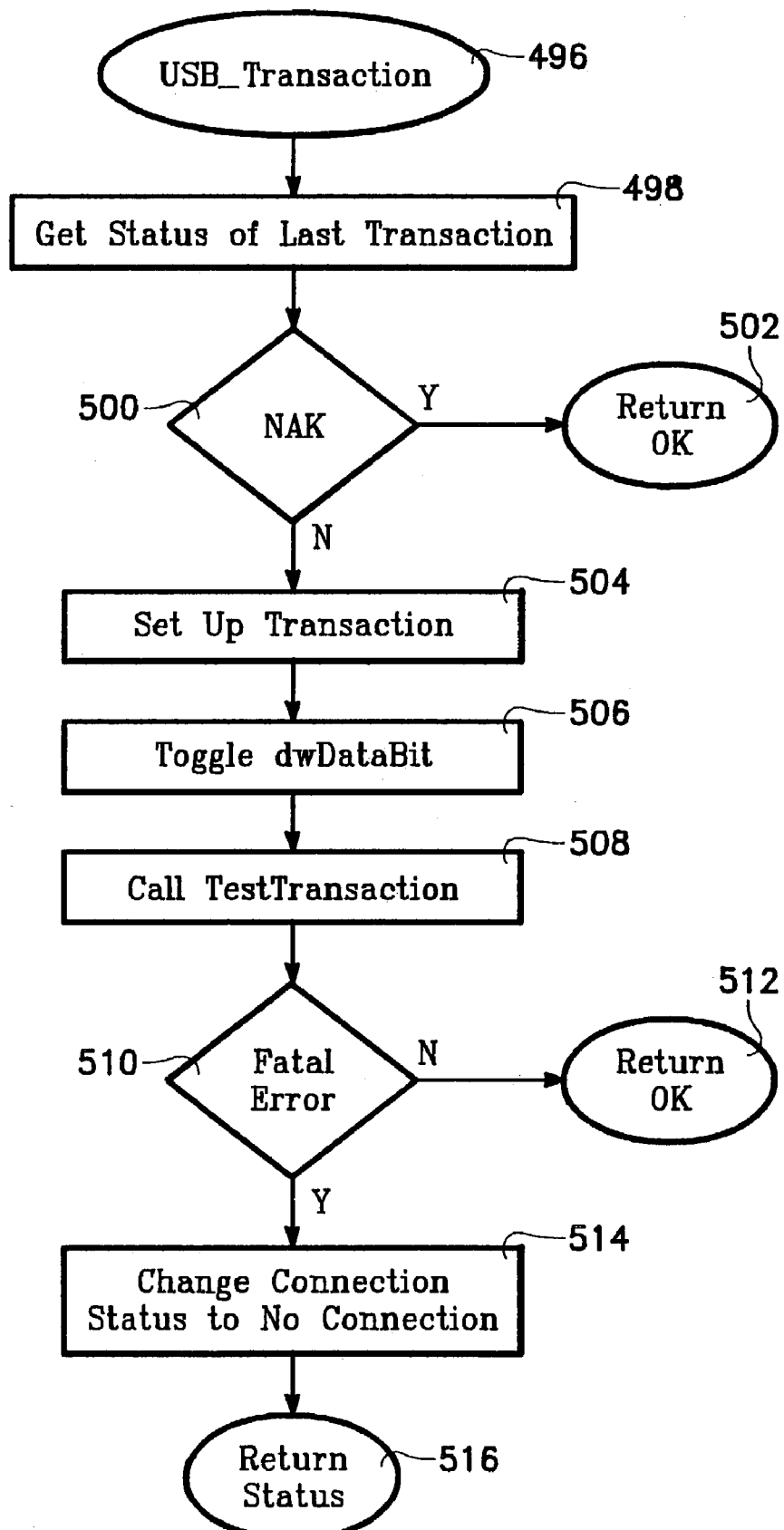

Referring to FIGS. 20, 22 and 23, the USB_DataIn routine (program step 490) which is called from the GamePadInput routine invokes a USB_Transaction routine, which includes an input token, a device address and a pointer to the input buffer. The size of the input buffer is set to the amount of data expected from the USB Game Pad 70.

Program step 498 gets the status of the last transaction. A negative acknowledge (program step 466) results in a return OK (program step 502). A negative acknowledge indicates that the USB game pad 70 is busy and has not yet acknowledged the last command. When there is no negative acknowledge, a transaction is set up by placing the input token and the device address in the appropriate memory location in the frame buffer.

Program step 506 toggles a data bit which is locate in the PacketToken. The data bit, which is a validation bit to the UHCI controller 124, needs to change polarity between each transaction, i.e. the data bit changes from 1 to 0 or 0 to 1 prior to each transaction. Program step 508 calls the TestTransaction routine illustrated in FIG. 24.

When there is a fatal error, connection status is changed to a no connection status (program step 514) for game pad 70 and the status is returned (program step 516). This allows the software to re-establish the game pad connection. When there is not a fatal error, a return OK occurs (program step 512).

Referring to FIGS. 20, 22, 23 and 24, the TestTransaction Routine (program step 518) checks to see if ControlStatus is active and as long as it is active a loop will occur (program step 520). When ControlStatus transitions to NOT_ACTIVE the transaction has been processed. Program step 522 checks an error bit in the ControlStatus word. If an error is detected, the software proceeds to program step 526. When an error is not detected a return OK occurs (program step 524).

Whenever an error is detected, the software determines the error type. When the error detected is STALLED, the error is fatal. A stalled error indicates that the USB game pad 70 did not respond to the last command and no response is provided by the USB game pad 70.

Figure 24:
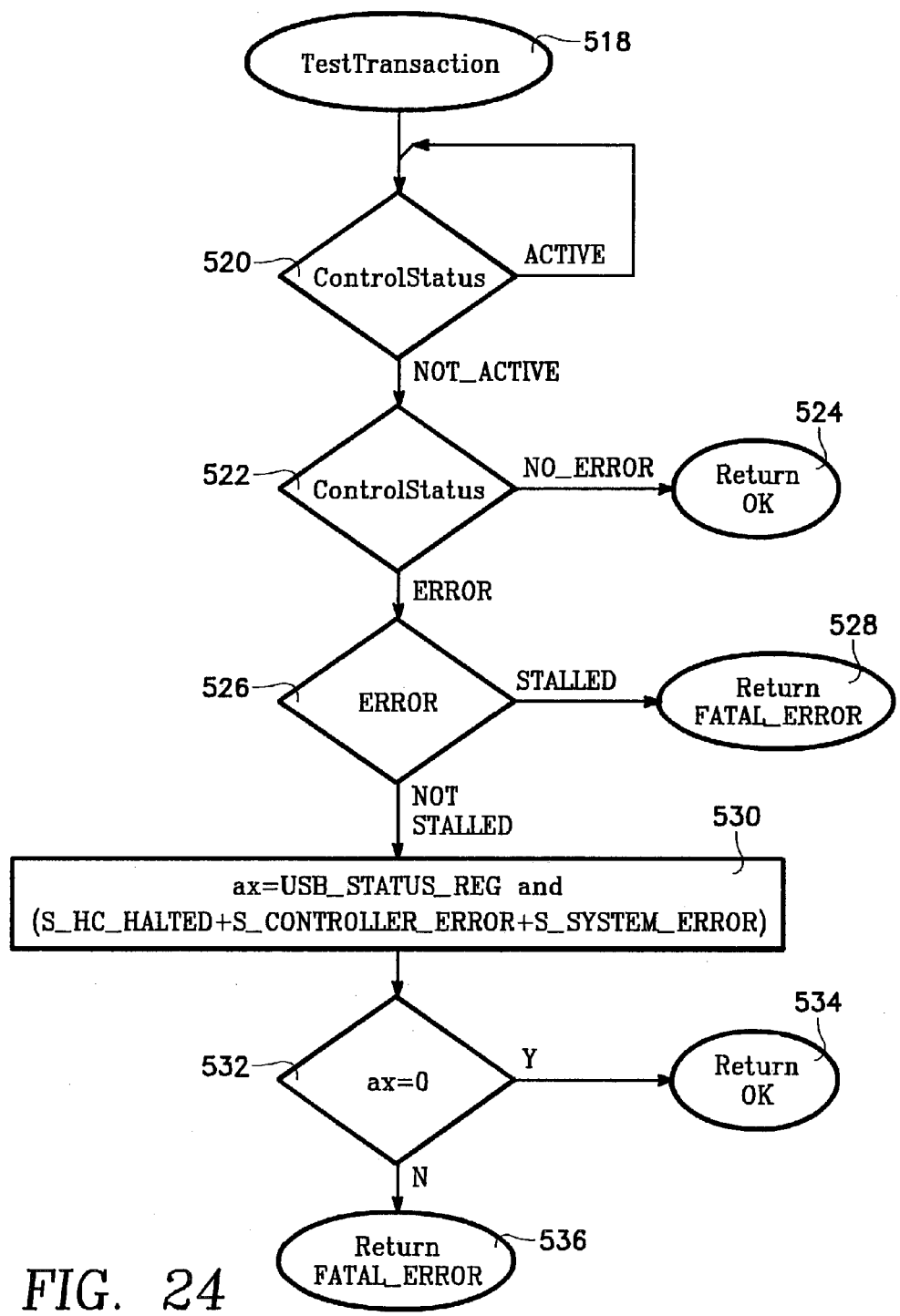

Whenever a not stalled condition occurs, a register is set up to indicate the actual status for the game pad transaction. During program step 530, the software "ANDs" the status register USB_STATUS_REG with three bits (S_HC_HALTED+S_CONTROLLER_ERROR+S_SYSTEM_ERROR as depicted in FIG. 24, program step 530). If any of the three bits are set than a fatal error occurs and Return FATAL_ERROR occurs (program step 536). For example, if the UHCI controller 124 enters into a halt state then the transaction failed and a fatal error is returned. Similarly, when there is an internal error within the UHCI controller, the transaction fails and a fatal error is returned. Finally, whenever there is a system error a fatal error is returned.

Whenever ax=0, that is the three bits are zero, then an OK is returned (program steps 532 and 534).

Data input occurs when the USB Game Pad 70 is in the Configured State with a data transfer input from End Point 1. Eight bytes of input data are received by the controller 20 and represent the following information:

| | |
|---|---|
| Byte 1 (count representing 8 bytes): | 01 |
| Byte 2 (button byte #1): | Button #8–button #1 |
| Byte 3 (button byte #2): | Button #13–button #9 |
| Byte 4 (directional pad position) | |
| Byte 5 (left joystick, left to right position) | |
| Byte 6 (left joystick, top to bottom position) | |
| Byte 7 (right joystick, left to right position) | |
| Byte 8 (right joystick, top to bottom position) | |

From the foregoing, it may readily be seen that the present invention comprises a new, unique and exceedingly useful camera controller which controls camera functions in order to obtain optimal recordings of launch events at a test range which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A camera lens control system for use at a test range, said camera lens control system controlling camera lens functions to obtain optimal recordings of launch events of an airborne vehicle at said test range, comprising:

a first camera having a lens, said first camera tracking a launch and a test flight of said airborne vehicle along a flight path for said airborne vehicle;

a second camera having a lens, said second camera tracking the launch and the test flight of said airborne vehicle along the flight path for said airborne vehicle;

said first camera and said second camera generating video flight data of the launch and the test flight of said airborne vehicle along the flight path for said airborne vehicle;

an Auto Focus and Zoom Controller connected to said first camera and said second camera to receive said video flight data of the launch and the test flight of said airborne vehicle;

a first video monitor and recorder connected to said Auto Focus and Zoom Controller to receive said video flight data generated by said first camera, said first video monitor and recorder, responsive to said video flight data received by said first video monitor and recorder, displaying the launch and the test flight of said airborne vehicle along the flight path for said airborne vehicle, said first video monitor and recorder recording the launch and the test flight of said airborne vehicle;

a second video monitor and recorder connected to said Auto Focus and Zoom Controller to receive said video flight data generated by said second camera, said second video monitor and recorder, responsive to said video flight data received by said second video monitor and recorder, displaying the launch and the test flight of said airborne vehicle along the flight path for said airborne vehicle, said second video monitor and recorder recording the launch and the test flight of said airborne vehicle and the flight path for said airborne vehicle;

said Auto Focus and Zoom Controller having a Universal Serial. Bus, a memory card, and a computer software program, said memory card storing flight path information which identifies the flight path for said airborne vehicle;

said Auto Focus and Zoom Controller controlling focus, zoom and iris settings for the lens of said first camera and the lens of said second camera during the launch and the test flight of said airborne vehicle along the flight path of said airborne vehicle when said first camera and said second camera are tracking said airborne vehicle;

said computer software program handling and interpreting said flight path information stored on said memory card enabling operation of said Auto Focus and Zoom Controller allowing said Auto Focus and Zoom Controller to automatically control the focus, zoom and iris settings for the lens of said first camera and the lens of said second camera during the launch and the test flight of said airborne vehicle along the flight path for said airborne vehicle;

an Universal Serial Bus (USB) game pad connected to the Universal Serial Bus of said Auto Focus and Zoom Controller, said USB game pad when connected to the Universal Serial Bus of said Auto Focus and Zoom Controller allowing an operator to manually control the focus, zoom and iris settings for the lens of said first camera and the lens of said second camera during the launch and the test flight of said airborne vehicle.

2. The camera lens control system of claim 1 wherein said USB game pad has a focus joystick, allowing said operator to manually adjust said focus settings for the lens of said first camera and the lens of said second camera, a zoom joystick allowing said operator to manually adjust said zoom settings for the lens of said first camera and the lens of said second camera, and an iris directional pad allowing said operator to manually adjust said iris settings for the lens of said first camera and the lens of said second camera.

3. The camera lens control system of claim 2 wherein said USB game pad has a lens one select switch and a lens two select switch, said lens one select switch when activated allowing said operator to manually adjust said focus, zoom and iris settings for the lens of said first camera by selectively activating said focus joystick, said zoom joystick and said iris directional pad, and said lens two select switch when activated allowing said operator to manually adjust said focus, zoom and iris settings for the lens of said second camera by selectively activating said focus joystick, said zoom joystick and said iris directional pad.

4. The camera lens control system of claim 2 wherein said focus, zoom, and iris settings for the lens of said first camera and the lens of said second camera are contained in a track file stored on said memory card, said focus, zoom and lens settings being preset in said track file for the flight path of said airborne vehicle which allows an operator to monitor said airborne vehicle without manually adjusting said focus, zoom and iris settings as said airborne vehicle travels along said flight path, said USB game pad having a start track button to activate said track file and a stop track button to de-activate said track file.

5. The camera lens control system of claim 1 further comprising:
- a focus table computer connected to said Auto Focus and Zoom Controller;
- a first focus table connected to said focus table computer;
- a second focus table connected to said focus table computer, wherein the computer software program for said Auto Focus and Zoom Controller controls operation of said focus table computer, said first focus table and said second focus table;
- said USB game pad having a focus table select switch which when activated allows said operator to manually control focus distance settings for said first focus table and said second focus table; and
- said USB game pad having a reset track button which when activated restarts automatic control by said computer software program of the focus distance settings for said first focus table and said second focus table.

6. The camera lens control system of claim 1 wherein said USB game pad has a toggle overlay button which when activated allows an operator to manually control display of a video overlay which appears on said first video monitor and recorder and said second video monitor and recorder, said video overlay including video data identifying the focus, zoom and iris settings for the lens of said first camera and the lens of said second camera.

7. The camera lens control system of claim 1 wherein said Auto Focus and Zoom Controller has a front panel, the front panel of said Auto Focus and Zoom Controller having first, second and third light emitting diodes mounted on said front panel, said first, second and third light emitting diodes indicating system status for said Auto Focus and Zoom Controller, said first, second and third light emitting diodes providing a visual indication of adjustments to said focus and zoom settings for the lens of said first camera and the lens of said second camera.

8. The camera lens control system of claim 1 wherein said Universal Serial Bus has a Universal Host Controller Interface to communicate with said USB game pad, said Auto Focus and Zoom Controller including device driver software, which enables communications between the Universal Serial Bus of said Auto Focus and Zoom Controller and said USB game pad in accordance with bus standards and data communication protocols for said Universal Host Controller Interface.

9. The camera lens control system of claim 1 further comprising a camera bayonet mount having said first camera and the lens of said first camera mounted thereon and a camera housing having said second camera and the lens of said second camera mounted therein.

10. A camera lens control system for use at a test range, said camera lens control system controlling camera lens functions to obtain optimal recordings of launch events of an airborne vehicle at said test range, comprising:
- a first camera having a lens, said first camera tracking a launch and a test flight of said airborne vehicle along a flight path for said airborne vehicle;
- a second camera having a lens, said second camera tracking the launch and the test flight of said airborne vehicle along the flight path for said airborne vehicle;
- said first camera and said second camera generating video flight data of the launch and the test flight of said airborne vehicle along the flight path for said airborne vehicle;
- an Auto Focus and Zoom Controller connected to said first camera and said second camera to receive said video flight data of the launch and the test flight of said airborne vehicle;
- a first video monitor and recorder connected to said Auto Focus and Zoom Controller to receive said video flight data generated by said first camera, said first video monitor and recorder, responsive to said video flight data received by said first video monitor and recorder, displaying the launch and the test flight of said airborne vehicle along the flight path for said airborne vehicle, said first video monitor and recorder recording the launch and the test flight of said airborne vehicle;
- a second video monitor and recorder connected to said Auto Focus and Zoom Controller to receive said video flight data generated by said second camera, said second video monitor and recorder, responsive to said video flight data received by said second video monitor and recorder, displaying the launch and the test flight of said airborne vehicle along the flight path for said airborne vehicle, said second video monitor and recorder recording the launch and the test flight of said airborne vehicle and the flight path for said airborne vehicle;
- said Auto Focus and Zoom Controller having a Universal Serial Bus, a memory card, and a computer software program, said memory card storing flight path information which identifies the flight path for said airborne vehicle;
- said Auto Focus and Zoom Controller controlling focus, zoom and iris settings for the lens of said first camera and the lens of said second camera during the launch and the test flight of said airborne vehicle along the flight path of said airborne vehicle when said first camera and said second camera are tracking said airborne vehicle;
- said computer software program handling and interpreting said flight path information stored on said memory card enabling operation of said Auto Focus and Zoom Controller allowing said Auto Focus and Zoom Controller to automatically control the focus, zoom and iris settings for the lens of said first camera and the lens of said second camera during the launch and the test flight of said airborne vehicle along the flight path for said airborne vehicle;
- a Universal Serial Bus (USB) game pad connected to the Universal Serial Bus of said Auto Focus and Zoom Controller, said USB game pad when connected to the Universal Serial Bus of said Auto Focus and Zoom Controller allowing an operator to manually control the focus, zoom and iris settings for the lens of said first camera and the lens of said second camera during the launch and the test flight of said airborne vehicle;
- the Universal Serial Bus of said Auto Focus and Zoom Controller having a Universal Host Controller Interface to communicate with said USB game pad;
- said Auto Focus and Zoom Controller including device driver software which enables communications between the Universal Serial Bus of said Auto Focus and Zoom Controller and said USB game pad in accordance with bus standards and data communication protocols for said Universal Host Controller Interface; and
- said USB game pad having a plurality of lens select switches, joysticks, and directional pads which an operator selectively activates to manually control the focus, zoom and iris settings for the lens of said first camera and the lens of said second camera during the launch and the test flight of said airborne vehicle along the flight path for said airborne vehicle.

11. The camera lens control system of claim 10 wherein said plurality of lens select switches, joysticks, and directional pads comprise a focus joystick, a zoom joystick, an iris directional pad, a lens select one switch and a lens select two switch, wherein said focus joystick allows said operator to manually adjust said focus settings for the lens of said first camera and the lens of said second camera, said zoom joystick allowing said operator to manually adjust said zoom settings for the lens of said first camera and the lens of said second camera, and said iris directional pad allowing said operator to manually adjust said iris settings for the lens of said first camera and the lens of said second camera.

12. The camera lens control system of claim 11 wherein said lens select one switch when activated allowing said operator to manually adjust said focus, zoom and iris settings for the lens of said first camera by selectively activating said focus joystick, said zoom joystick and said iris directional pad, and said lens select two switch when activated allowing said operator to manually adjust said focus, zoom and iris settings for the lens of said second camera by selectively activating said focus joystick, said zoom joystick and said iris directional pad.

13. The camera lens control system of claim 10 wherein said focus, zoom, and iris settings for the lens of said first camera and the lens of said second camera are contained in a track file stored on said memory card, said focus, zoom and lens settings being preset in said track file for the flight path of said airborne vehicle which allows an operator to monitor said airborne vehicle without manually adjusting said focus, zoom and iris settings as said airborne vehicle travels along said flight path, said USB game pad having a start track button to activate said track file and a stop track button to de-activate said track file.

14. The camera lens control system of claim 10 further comprising:
a focus table computer connected to said Auto Focus and Zoom Controller;
a first focus table connected to said focus table computer;
a second focus table connected to said focus table computer, wherein the computer software program for said Auto Focus and Zoom Controller controls operation of said focus table computer, said first focus table and said second focus table;
said USB game pad having a focus table select switch which when activated allows said operator to manually control focus distance settings for said first focus table and said second focus table; and
said USB game pad having a reset track button which when activated restarts automatic control by said computer software program of the focus distance settings for said first focus table and said second focus table.

15. The camera lens control system of claim 10 wherein said USB game pad has a toggle overlay button which when activated allows an operator to manually control display of a video overlay which appears on said first video monitor and recorder and said second video monitor and recorder, said video overlay including video data identifying the focus, zoom and iris settings for the lens of said first camera and the lens of said second camera.

16. The camera lens control system of claim 10 wherein said Auto Focus and Zoom Controller has a front panel, the front panel of said Auto Focus and Zoom Controller having first, second and third light emitting diodes mounted on said front panel, said first, second and third light emitting diodes indicating system status for said Auto Focus and Zoom Controller, said first, second and third light emitting diodes providing a visual indication of adjustments to said focus and zoom settings for the lens of said first camera and the lens of said second camera.

17. The camera lens control system of claim 10 further comprising a camera bayonet mount having said first camera and the lens of said first camera mounted thereon and a camera housing having said second camera and the lens of said second camera mounted therein.

18. A camera lens control system for use at a test range, said camera lens control system controlling camera lens functions to obtain optimal recordings of launch events of an airborne vehicle at said test range, comprising:
a first camera having a lens, said first camera tracking a launch and a test flight of said airborne vehicle along a flight path for said airborne vehicle;
a second camera having a lens, said second camera tracking the launch and the test flight of said airborne vehicle along the flight path for said airborne vehicle;
said first camera and said second camera generating video flight data of the launch and the test flight of said airborne vehicle along the flight path for said airborne vehicle;
an Auto Focus and Zoom Controller connected to said first camera and said second camera to receive said video flight data of the launch and the test flight of said airborne vehicle;
a first video monitor and recorder connected to said Auto Focus and Zoom Controller to receive said video flight data generated by said first camera, said first video monitor and recorder, responsive to said video flight data received by said first video monitor and recorder, displaying the launch and the test flight of said airborne vehicle along the flight path for said airborne vehicle, said first video monitor and recorder recording the launch and the test flight of said airborne vehicle;
a second video monitor and recorder connected to said Auto Focus and Zoom Controller to receive said video flight data generated by said second camera, said second video monitor and recorder, responsive to said video flight data received by said second video monitor and recorder, displaying the launch and the test flight of said airborne vehicle along the flight path for said airborne vehicle, said second video monitor and recorder recording the launch and the test flight of said airborne vehicle and the flight path for said airborne vehicle;
said Auto Focus and Zoom Controller having a Universal Serial Bus, a memory card, and a computer software program, said memory card storing flight path information which identifies the flight path for said airborne vehicle;
said Auto Focus and Zoom Controller controlling focus, zoom and iris settings for the lens of said first camera and the lens of said second camera during the launch and the test flight of said airborne vehicle along the flight path of said airborne vehicle when said first camera and said second camera are tracking said airborne vehicle;
said computer software program handling and interpreting said flight path information stored on said memory card enabling operation of said Auto Focus and Zoom Controller allowing said Auto Focus and Zoom Controller to automatically control the focus, zoom and iris settings for the lens of said first camera and the lens of said second camera during the launch and the test flight of said airborne vehicle along the flight path for said airborne vehicle;

a Universal Serial Bus (USB) game pad connected to the Universal Serial Bus of said Auto Focus and Zoom Controller, said USB game pad when connected to the Universal Serial Bus of said Auto Focus and Zoom Controller allowing an operator to manually control the focus, zoom and iris settings for the lens of said first camera and the lens of said second camera during the launch and the test flight of said airborne vehicle;

the Universal Serial Bus of said Auto Focus and Zoom Controller having a Universal Host Controller Interface to communicate with said USB game pad;

said Auto Focus and Zoom Controller including device driver software, which enables communications between the Universal Serial Bus of said Auto Focus and Zoom Controller and said USB game pad in accordance with bus standards and data communication protocols for said Universal Host Controller Interface; and said USB game pad having a focus joystick, a zoom joystick, an iris directional pad, a lens select one switch and a lens select two switch, wherein said focus joystick allows said operator to manually adjust said focus settings for the lens of said first camera and the lens of said second camera, said zoom joystick allowing said operator to manually adjust said zoom settings for the lens of said first camera and the lens of said second camera, and said iris directional pad allowing said operator to manually adjust said iris settings for the lens of said first camera and the lens of said second camera, wherein said lens select one switch when activated allowing said operator to manually adjust said focus, zoom and iris settings for the lens of said first camera by selectively activating said focus joystick, said zoom joystick and said iris directional pad, and said lens select two switch when activated allowing said operator to manually adjust said focus, zoom and iris settings for the lens of said second camera by selectively activating said focus joystick, said zoom joystick and said iris directional pad; and a track file having said focus, zoom, and iris settings for the lens of said first camera and the lens of said second camera contained therein, said track file being stored on said memory card, said focus, zoom and lens settings being preset in said track file for the flight path of said airborne vehicle which allows an operator to monitor said airborne vehicle without manually adjusting said focus, zoom and iris settings as said airborne vehicle travels along said flight path, said USB game pad having a start track button to activate said track file and a stop track button to de-activate said track file.

19. The camera lens control system of claim 18 wherein said Auto Focus and Zoom Controller has a front panel, the front panel of said Auto Focus and Zoom Controller having first, second and third light emitting diodes mounted on said front panel, said first, second and third light emitting diodes indicating system status for said Auto Focus and Zoom Controller, said first, second and third light emitting diodes providing a visual indication of adjustments to said focus and zoom settings for the lens of said first camera and the lens of said second camera.

* * * * *